US011513760B2

(12) United States Patent
Vartakavi et al.

(10) Patent No.: US 11,513,760 B2
(45) Date of Patent: Nov. 29, 2022

(54) MACHINE-LED MOOD CHANGE

(71) Applicant: Gracenote, Inc., Emeryville, CA (US)

(72) Inventors: Aneesh Vartakavi, Emeryville, CA (US); Peter C. DiMaria, Berkeley, CA (US); Michael Gubman, San Francisco, CA (US); Markus K. Cremer, Orinda, CA (US); Cameron Aubrey Summers, Oakland, CA (US); Gregoire Tronel, Santa Monica, CA (US)

(73) Assignee: GRACENOTE, INC., Emeryville, CA (US)

( * ) Notice: Subject to any disclaimer, the term of this patent is extended or adjusted under 35 U.S.C. 154(b) by 0 days.

(21) Appl. No.: 16/837,539

(22) Filed: Apr. 1, 2020

(65) Prior Publication Data

US 2020/0233637 A1 Jul. 23, 2020

Related U.S. Application Data

(63) Continuation of application No. 16/102,143, filed on Aug. 13, 2018, now Pat. No. 10,613,821, which is a
(Continued)

(51) Int. Cl.
*G06F 3/16* (2006.01)
*G06F 16/638* (2019.01)
*H04L 67/50* (2022.01)

(52) U.S. Cl.
CPC ............ *G06F 3/165* (2013.01); *G06F 16/639* (2019.01); *H04L 67/535* (2022.05)

(58) Field of Classification Search
USPC ........................................................ 700/94
See application file for complete search history.

(56) References Cited

U.S. PATENT DOCUMENTS

| 5,243,517 A | 9/1993 | Schmidt et al. |
| 5,676,138 A | 10/1997 | Zawilinski |

(Continued)

FOREIGN PATENT DOCUMENTS

| EP | 2579169 | 4/2013 |
| WO | 2008004181 | 1/2008 |

OTHER PUBLICATIONS

Barthet et al., "Moodplay: an interactive mood-based musical experience", Queen Mary, University of London, 2015, 9 pages.
(Continued)

*Primary Examiner* — Amal S Zenati
(74) *Attorney, Agent, or Firm* — McDonnell Boehnen Hulbert & Berghoff

(57) ABSTRACT

A machine is configured to identify a media file that, when played to a user, is likely to modify an emotional or physical state of the user to or towards a target emotional or physical state. The machine accesses play counts that quantify playbacks of media files for the user. The playbacks may be locally performed or detected by the machine from ambient sound. The machine accesses arousal scores of the media files and determines a distribution of the play counts over the arousal scores. The machine uses one or more relative maxima in the distribution in selecting a target arousal score for the user based on contextual data that describes an activity of the user. The machine selects one or more media files based on the target arousal score. The machine may then cause the selected media file to be played to the user.

26 Claims, 24 Drawing Sheets

Related U.S. Application Data continuation of application No. 15/721,161, filed on Sep. 29, 2017, now Pat. No. 10,048,931, which is a continuation of application No. 14/980,650, filed on Dec. 28, 2015, now Pat. No. 9,792,084.

(60) Provisional application No. 62/099,401, filed on Jan. 2, 2015.

(56) References Cited

U.S. PATENT DOCUMENTS

| | | | |
|---|---|---|---|
| 6,212,502 | B1 | 4/2001 | Ball et al. |
| 6,520,905 | B1 | 2/2003 | Surve et al. |
| 6,888,457 | B2 | 3/2005 | Wilkinson et al. |
| 7,031,980 | B2 | 4/2006 | Logan et al. |
| 7,698,238 | B2 | 4/2010 | Barletta et al. |
| 7,921,067 | B2 | 4/2011 | Kemp et al. |
| 8,260,778 | B2 | 9/2012 | Ghatak |
| 8,373,768 | B2 | 2/2013 | Bill |
| 8,671,068 | B2 | 3/2014 | Harber et al. |
| 8,855,798 | B2 | 10/2014 | DiMaria et al. |
| 9,317,185 | B2 | 4/2016 | Martin et al. |
| 9,613,466 | B1* | 4/2017 | Bullock .................. G07C 5/00 |
| 9,792,084 | B2 | 10/2017 | Vartakavi et al. |
| 10,048,931 | B2 | 8/2018 | Vartakavi et al. |
| 10,373,611 | B2 | 8/2019 | Jeyachandran et al. |
| 10,613,821 | B2 | 4/2020 | Vartakavi et al. |
| 2003/0028383 | A1 | 2/2003 | Guerin et al. |
| 2003/0063222 | A1 | 4/2003 | Creed et al. |
| 2004/0128286 | A1 | 7/2004 | Yasushi et al. |
| 2006/0212478 | A1 | 9/2006 | Plastina et al. |
| 2007/0074619 | A1 | 4/2007 | Vergo |
| 2008/0030313 | A1* | 2/2008 | Obradovich .......... G06F 16/221 340/576 |
| 2008/0091512 | A1 | 4/2008 | Marci et al. |
| 2008/0109391 | A1 | 5/2008 | Chan |
| 2009/0234888 | A1 | 9/2009 | Holmes et al. |
| 2009/0281906 | A1 | 11/2009 | Cai et al. |
| 2010/0011388 | A1 | 1/2010 | Bull et al. |
| 2011/0289075 | A1 | 11/2011 | Nelson |
| 2012/0226706 | A1 | 9/2012 | Choi et al. |
| 2012/0259683 | A1 | 10/2012 | Cochran et al. |
| 2013/0178962 | A1* | 7/2013 | DiMaria ............. G06F 3/04842 700/94 |
| 2013/0339877 | A1 | 12/2013 | Skeen et al. |
| 2014/0277649 | A1* | 9/2014 | Chong .................. H04H 60/46 700/94 |
| 2014/0330848 | A1 | 11/2014 | Chen et al. |
| 2016/0162565 | A1 | 6/2016 | Jung et al. |

OTHER PUBLICATIONS

Borghini et al., "Measuring neurophysiological signals in aircraft pilots and car drivers for the assessment of mental workload, fatigue and drowsiness", Neuroscience and Biobehavioral Reviews 44, (2014), 18 pages.

Cox, "Roughness", University of Salford Manchester, <http://www.acoustics.salford.ac.uk/acoustics_info/sound_quality/?content>, retrived on Mar. 21, 2014, 3 pages.

Fairclough, Stephen, et al., "A metabolic measure of mental effort", [Online]. Retrieved from the Internet: <URL: http://physiologicalcomputing.org/wpcontent/uploads/2015/03/fairclough-houston041.pdf, (Oct. 9, 2003), 177-190, 14 pages.

Gerhard, David, "Automatic Interval Naming Using Relative Pitch", School of Computing Science, Simon Fraser University, May 16, 2014, 11 pages.

Hu et al., "Improving Mood Classification in Music Digital Libraries by Combining Lyrics and Audio", Association of Computing Machinery, JCDL '10 Proceedings of the 10th annual joint conference on Digital libraries, Retrieved from the Internet:<URL: http://www.musicir.org/archive/papers/JCDL2011_1mproving_Mood_Classification.pdf>; (Jun. 2010), 10 panes.

International Searching Authority, "International Search Report," issued in connection with International Application No. PCT/US2015/067889, dated Mar. 25, 2016, 2 pages.

International Searching Authority, "Written Opinion," issued in connection with International Application No. PCT/US2015/067889, dated Mar. 25, 2016, 8 pages.

Liu, David, et al., "Listen to Your Heart: Stress Prediction Using Consumer Heart Rate Sensors", [Online]. Retrieved from the Internet: <URL: http://cs229.stanford.edu/proj2013/LiuUlrich-ListenToYourHeart-StressPredictionUsingConsumerHeartRateSensors.pdf, (Autumn 2013-2014), 5 pages.

The Local, "New mobile tech makes music to suit moods", <http://www.thelocal.no/20141114/new-mobile-tech-makes-music-to-suit-moods>, published on Nov. 17, 2014, 2 pages.

Lu, et al., "A Technique towards Automatic Audio Classification and Retrieval", Gippsland School of Computing and Information Technology, Monash University, 1998, 4 pages.

Owen Craigie Meyers, "A Mood-Based Music Classification and Exploration System", School of Architecture and Planning, Massachusetts Institute of Technology, Jun. 2007, 93 pages.

"PAD emotional state model", Wikipedia, [Online]. Retrieved from the Internet: <URL: https://en.wikipedia.org/wiki/PAD_emotional_state_model, (Accessed Nov. 11, 2015), 3 pages.

Peeters, Geoffroy, "A Large Set of Audio Features for Sound Description", Apr. 23, 2004, 25 pages.

Peeters, Geoffroy, "Chroma-based estimation of musical key from audio-signal analysis", Ircam—Sound Analysis/Synthesis Team, 2006, 6 pages.

Renneker, Will, "The Effects of Calming and Exciting Music on Galvanic Skin Response and Cognition", [Online]. Retrieved from the Internet: <URL: http://webs.wofford.edu/pittmandw/psy330/exps/2010/WR2.htm, (Accessed Oct. 28, 2015), 6 pages.

Rowe, Dennis W., et al., "Heart Rate Variability: Indicator of User State as an Aid to Human-Computer Interaction", [Online]. Retrieved from the Internet: <URL: http://wwwlabs.iro.umontreal.ca/~blanchae/papers/physiologie/Heart%20rate%20variability%20%20indicator%20of%20user%20state%20as%20an%20aid%20to%20HCI.pdf, (Apr. 1998), 479-487.

Sullivan, Thomas J., et al., "A Low-Noise, Non-Contact EEG/ECG Sensor", [Online]. Retrieved from the Internet: <URL: http://isn.ucsd.edu/pubs/biocas07_eeg.pdf, (2007), 4 pages.

West, Kris, "Mirex Audio Genre Classification", School of Computing Sciences, University of East Anglia, 2005, 3 pages.

Wikipedia, "Brightness", <http://en.wikipedia.org/w/index.php?title=Brightness&oldid=543629699>, dated Mar. 12, 2013, 2 pages.

Wikipedia, "Spectral Flatness", <http://en.wikipedia.org/w/index.php?title=Spectral_flatness&oldid=586657451>, dated Dec. 18, 2013, 2 pages.

International Bureau, "International Preliminary Report on Patentability," issued in connection with International Patent Application No. PCT/US15/67889, dated Jan. 11, 2017, 25 pages.

United States Patent and Trademark Office, "Notice of Allowance," issued in connection with U.S. Appl. No. 14/980,650, dated Jun. 16, 2017, 16 pages.

United States Patent and Trademark Office, "Non-Final Office Action," issued in connection with U.S. Appl. No. 14/980,650, dated Jan. 26, 2017, 20 pages.

United States Patent and Trademark Office, "Final Office Action," issued in connection with U.S. Appl. No. 15/721,161, dated Mar. 26, 2018, 5 pages.

United States Patent and Trademark Office, "Non-Final Office Action," issued in connection with U.S. Appl. No. 15/721,161, dated Dec. 5, 2017, 10 pages.

United States Patent and Trademark Office, "Notice of Allowance," issued in connection with U.S. Appl. No. 15/721,161, dated Apr. 13, 2018, 5 pages.

United States Patent and Trademark Office, "Non-Final Office Action," issued in connection with U.S. Appl. No. 16/102,143, dated Mar. 7, 2019, 9 pages.

United States Patent and Trademark Office, "Final Office Action," issued in connection with U.S. Appl. No. 16/102,143, dated Sep. 19, 2019, 5 pages.

(56) References Cited

OTHER PUBLICATIONS

United States Patent and Trademark Office, "Notice of Allowance," issued in connection with U.S. Appl. No. 16/102,143, dated Nov. 20, 2019, 5 pages.

* cited by examiner

SYSTEM DESCRIPTION

- FOR THE DEMO, USER IS ASKED TO SELECT FROM A LIST OF PRE-TRAINED LISTENER PROFILES (HARD ROCK, HIP-HOP, POP, ...)

- USE HEART RATE AND SEAT POSITION ON TWO-DIMENSIONAL GRID (FLOW MODEL)

- GPS + NAV INFO INFLUENCES OCCASION.

- ALGORITHM USES THE COORDINATES IN GRID, ALONG WITH SAMPLE LISTENER PROFILE AND OCCASION TO CREATE A PLAYLIST, ATTEMPTING TO GUIDE THE DRIVER INTO THE FLOW STATE.

- USE MUSIC ATTRIBUTES (LIKE TEMPO, MOOD, AND FAMILIARITY) TO PROVIDE PERSONALIZED PLAYLIST

- USER CAN CONTROL LATER RESPONSE TO FEEDBACK – FAST RESPONSE = MORE DYNAMIC PLAYLIST

*FIG. 12*

MOTIVATION

○ CONTEXTUAL PLAY LISTING IN CARS

○ CREATE A PLAYLIST BASED ON DRIVER STATE AND OCCASION

– SENSORS (PRESSURE SENSORS + EEG) DETECT DRIVER STATE

– OCCASION SELECTED BY USER

*FIG. 13*

EXAMPLE SCENARIO

SCENE:
1. DEPARTURE → BRIEF STOP (INCL. EXITING): SIMULATING COMMUTE TO WORK
2. BRIEF STOP → ARRIVAL (END OF DEMO.): SIMULATING RETURN HOME

○ SCENE 1 & 2 ARE SEQUENTIAL, EACH SCENE WILL BE ABOUT 2 AND 3 MINUTES.

CORRESPONDING SITUATIONS (PSEUDO-SITUATIONS)
○ ENCOURAGED MUSIC    ENHANCEMENT FOR THE MOOD GOING TO WORK
○ SEDATED MUSIC       LEAVE THE MOOD TO RELAXATION
                      (BUT SATISFIED STATE UNDER DRIVING)

○ HOW TO DELIVER THE SCENE INDEX LOCATED IN FLOW DIAGRAM  – DELIVERY OF API

○ FOR MUSIC SELECTION, SCENE BASED + EACH PROFILE, AND LIST FOR CATEGORY
   FOR EXAMPLE: JAPANESE MUSIC, WESTERN MUSIC, CLASSIC MUSIC, . . . ~PROFILE

*FIG. 14*

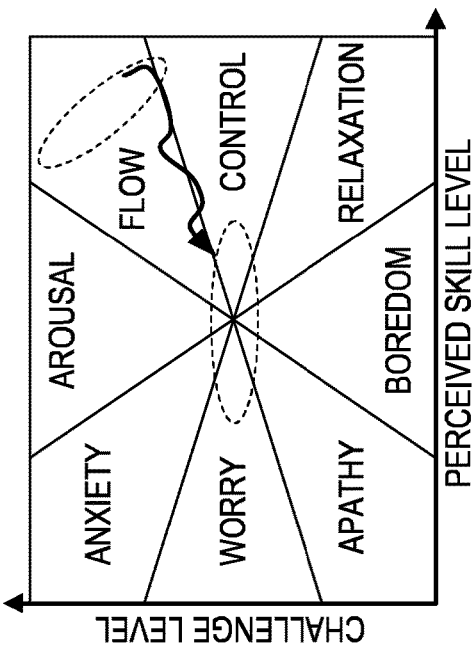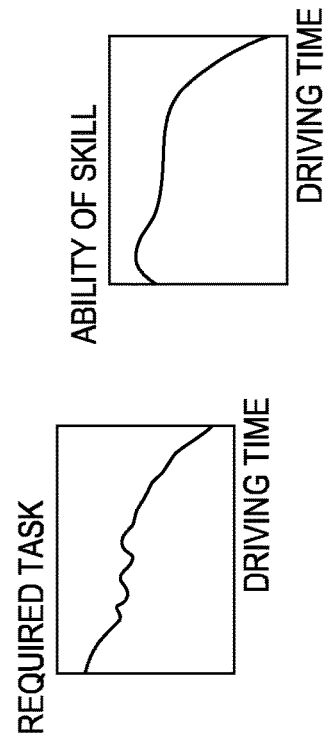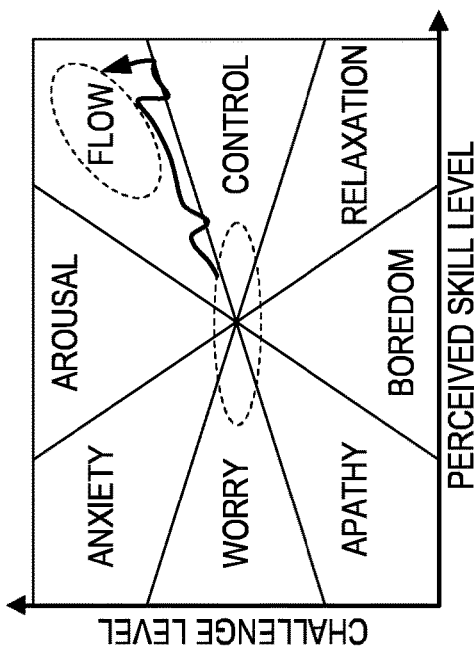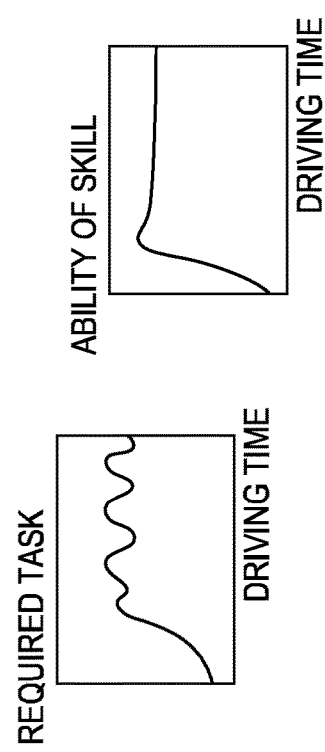
FIG. 15

INTERFACE

- BASED ON THE "FLOW MODEL"
- FLOW IS A STATE OF COMPLETE ABSORPTION IN WHAT ONE DOES
- PROPOSED BY MIHALY CSIKSZENTMIHALYI

CORE ALGORITHM UPDATE

- EARLY PROTOTYPE HAS THE FOLLOWING PROPERTIES

- BASED ON THE ENERGY OR THE *SUBJECTIVE AROUSAL* OF THE MUSIC
  - USES TASTE PROFILE TO RECOMMEND FAMILIAR OR UNFAMILIAR MUSIC
  - SELECTABLE TARGET STATE (DEPENDS ON SCENARIO)
  - LINEAR COMPENSATION (PLAYS CALM MUSIC IF PERSON IS AGITATED AND VICE VERSA)

*FIG. 17*

FEATURES

○ ABILITY TO CHOOSE A TARGET ENERGY (BASED ON OCCASION)

○ SELECT ENERGY TO COMPENSATE CURRENT ENERGY

○ PEAK AND DISTANCE FROM TARGET WEIGHTING TO SELECT FAMILIAR SONGS OFTEN

○ RANDOM NOISE ADDED TO EXPLORE UNFAMILIAR SONGS IN COLLECTION

*FIG. 20*

MACHINE-LED MOOD CHANGE

RELATED APPLICATIONS

This patent arises from a continuation of U.S. application Ser. No. 16/102,143 (now U.S. Pat. No. 10,613,821), titled "Machine-Led Mood Change," filed Aug. 13, 2018, which is a continuation of U.S. application Ser. No. 15/721,161 (now U.S. Pat. No. 10,048,931), titled "Machine-Led Mood Change," filed Sep. 29, 2017, which is a continuation U.S. application Ser. No. 14/980,650 (now U.S. Pat. No. 9,792,084), titled "Machine-Led Mood Change," filed Dec. 28, 2015, which claims the benefit under 35 U.S.C. § 119(e) to U.S. Provisional Application No. 62/099,401, titled "Approaches for Selecting Music Mood," and filed Jan. 2, 2015. U.S. application Ser. No. 16/102,143; U.S. application Ser. No. 15/721,161; U.S. application Ser. No. 14/980,650; and U.S. Provisional Application No. 62/099,401 are incorporated herein by this reference in their entireties.

TECHNICAL FIELD

The subject matter disclosed herein generally relates to the technical field of special-purpose machines that perform or otherwise facilitate audio processing, including computerized variants of such special-purpose machines and improvements to such variants, and to the technologies by which such special-purpose machines become improved compared to other special-purpose machines that perform or otherwise facilitate audio processing. Specifically, the present disclosure addresses systems and methods to facilitate one or more machine-led mood changes.

BACKGROUND

People often listen to music while performing various activities, such as, driving to various destinations in various driving conditions. Typically, people often rely on radio stations or various other curated music selections during such activities. However, music selected in this manner may have a mood that is inappropriate for the current state of a person (e.g., the driver) or the current conditions (e.g., driving conditions, such as weather conditions, traffic conditions, road conditions) for performing the activity in which the person is engaged.

BRIEF DESCRIPTION OF THE DRAWINGS

Some embodiments are illustrated by way of example and not limitation in the figures of the accompanying drawings.

FIGS. 12-16 illustrate example approaches for selecting music mood, in accordance with various example embodiments.

FIG. 17 illustrates an example approach for determining and describing a user state, in accordance with various example embodiments.

FIGS. 18-20 illustrate example approaches for selecting music mood, in accordance with various example embodiments.

DETAILED DESCRIPTION

Figure 1:
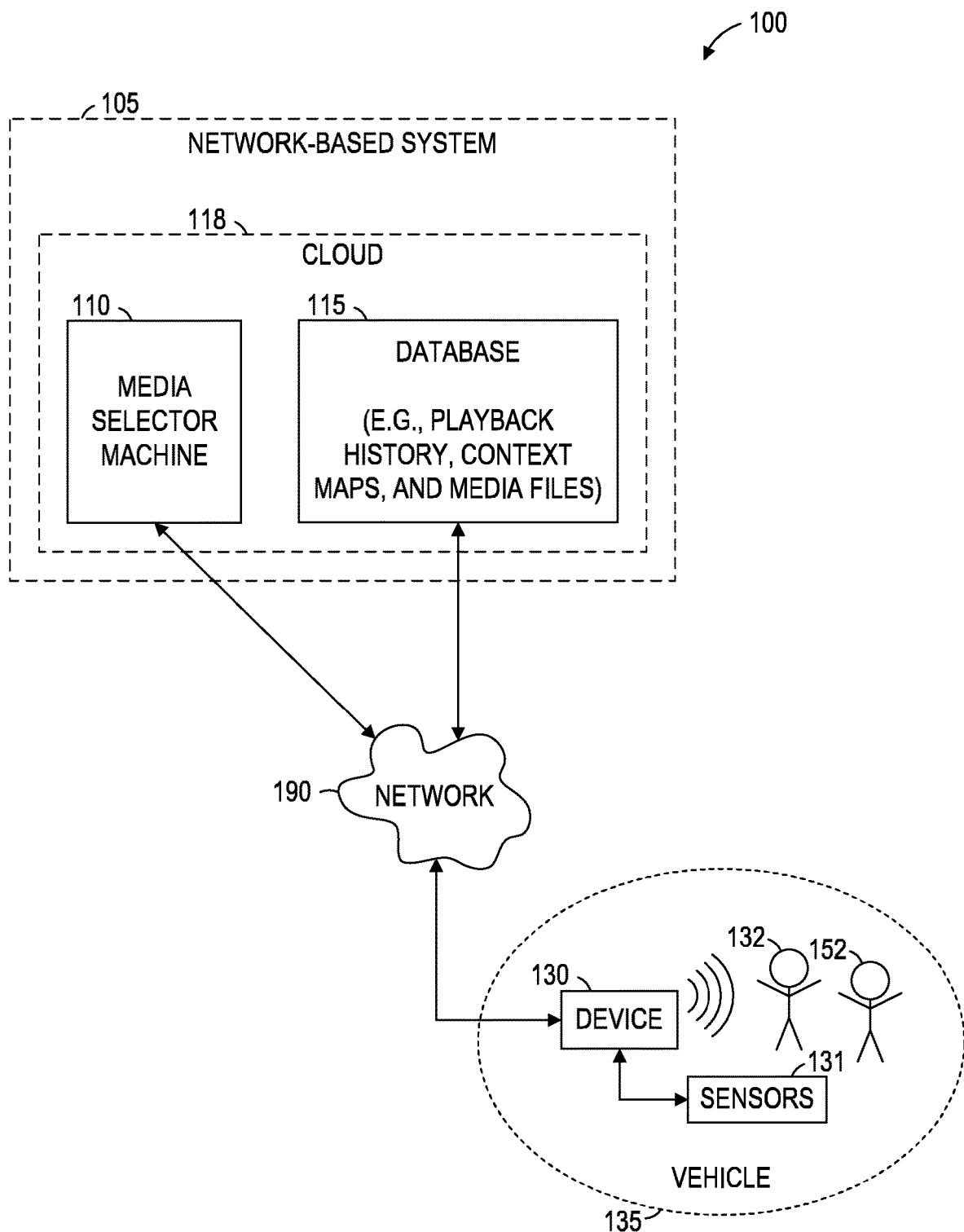
FIG. 1 is a network diagram illustrating a network environment suitable for machine-led mood change, according to some example embodiments.

Example methods (e.g., algorithms) facilitate machine-led mood changes, and example systems (e.g., special-purpose machines) are configured to facilitate machine-led mood changes. These example methods and systems configure a machine to perform machine-leading of one or more changes in musical mood, which may consequently result in machine-leading of one or more changes in a person's emotional state (e.g., the mood of a listener, such as a driver of a vehicle). Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Emotional states for humans can be modeled by a Pleasure, Arousal, and Dominance (PAD) model of emotional states. The PAD model uses three dimensions or axes: one for pleasure-displeasure (e.g., pleasant-unpleasant), one for arousal-nonarousal (e.g., high energy versus low energy), and one for dominance-submissiveness (e.g., controlling-controlled). Using the PAD model, emotional states (e.g., moods) can be represented (e.g., within a memory or otherwise within a machine) as three-dimensional vectors. For example, an emotional state can be represented by three scalar values: a pleasure value (e.g., representing a degree of pleasantness), an arousal value (e.g., representing an energy level), and a dominance value (e.g., representing a degree of dominance).

A machine may be configured to interact with one or more users by automatically selecting, recommending, suggesting, or otherwise identifying music to be played for the one or more users. For example, if the machine has access to a list that indicates the user's personally preferred musical genres (e.g., heavy metal and classical), the machine may search a library of media files (e.g., music files, such as song files), find music files that match the user's preferred genres, and automatically play one or more of the matching media files (e.g., by causing itself or a device of the user to play a matched media file). The machine may also interact with the user by recommending or suggesting a matching media files, detecting a confirmation or other authorization from the user to play or purchase the matching media files, and accordingly causing itself or a device of the user to initiate the playing or purchasing of the matching media files.

In particular, a machine (e.g., a media selector machine or device) may be configured (e.g., by software) to automatically select, recommend, suggest, or otherwise identify media (e.g., music) to be played for a user. Specifically, the machine may be configured to select or otherwise identify a media file that, when played to the user, is likely to modify an emotional or physical state of the user (e.g., stimulate a drowsy driver or calm an agitated driver). In some example configurations, the machine accesses play counts that quantify full or partial playbacks of media files that have been played for the user (e.g., played as requested by the user or played in the presence of the user). The playbacks may be locally performed (e.g., played by the machine itself) or detected by the machine from ambient sound. The machine accesses arousal scores (e.g., energy levels or energy values) of the media files and determines a distribution of the play counts over the arousal scores, thus enabling the machine to identify one or more relative maxima (e.g., local peaks) in the distribution of the play counts. The machine also selects a target arousal score for the user based on contextual data that describes an activity in which the user is engaged (e.g., driving a car to work, working, or driving the car home).

The machine then selects one of the relative maxima (e.g., a local peak whose corresponding arousal score is near the target arousal score) and selects one or more media files having similar arousal scores for playback to the user. In certain example embodiments, the machine determines a current arousal score of the user based on one or more biometric measurements of the user, and the selection of the relative maximum from the distribution, the selection of the one or more media files, or both, are based on the current arousal score in comparison to the target arousal score. In some example embodiments, the machine may cause the selected media file to be played to the user (e.g., by the machine itself or by a device of the user). Further details and example embodiments are discussed below.

For clarity, the example embodiments discussed herein are described as using arousal scores that indicate energy levels (e.g., positive or negative) humanly perceivable in playbacks of the audio content (e.g., playbacks of the media files), according to the PAD model of emotional states. However, various example embodiments can be configured to operate in a similar fashion using one or more other types of scores from the PAD model of emotional states. For example, the methods and systems described herein can be configured to use a combination of arousal scores, pleasantness scores (e.g., valence levels or valence values) that indicate levels of pleasantness (e.g., positive or negative), or dominance scores (e.g., levels of control or values that specify amounts of control) that indicate levels of dominance, within the PAD model of emotional states.

FIG. 1 is a network diagram illustrating a network environment 100 suitable for machine-led mood change, according to some example embodiments. The network environment 100 includes a media selector machine 110, a database 115, and a device 130 (e.g., a user device or a vehicle device), all communicatively coupled to each other via a network 190. The media selector machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the device 130). The media selector machine 110, the database 115, and the device 130 may each be implemented in a special-purpose (e.g., specialized) computer system, in whole or in part, as described below with respect to FIG. 24.

As shown in FIG. 1, the device 130 may be included within a vehicle 135 (e.g., a car, a boat, a truck, or an airplane) that is equipped with one or more sensors 131 (e.g., biometric sensors or other input components described below with respect to FIG. 24). The one or more sensors 131 are shown as being communicatively coupled (e.g., by wired or wireless connections) to the device 130. In some example embodiments, the sensors 131 are included within the device 130 (e.g., as described below with respect to FIG. 24).

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is associated with the device 130, the vehicle 135, or both, and may be a user of the device 130, an operator (e.g., a driver or pilot) of the vehicle 135, or both. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. The user 152 may also be associated with the device 130 and may be another user of the device 130, a passenger (e.g., a rider) of the vehicle 135, or both. Accordingly, the device 130 may playback one or more media files (e.g., selected by the media selector machine 110, selected by the device 130, or both) for the user 132, the user 152, or both.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 24, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the media selector machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
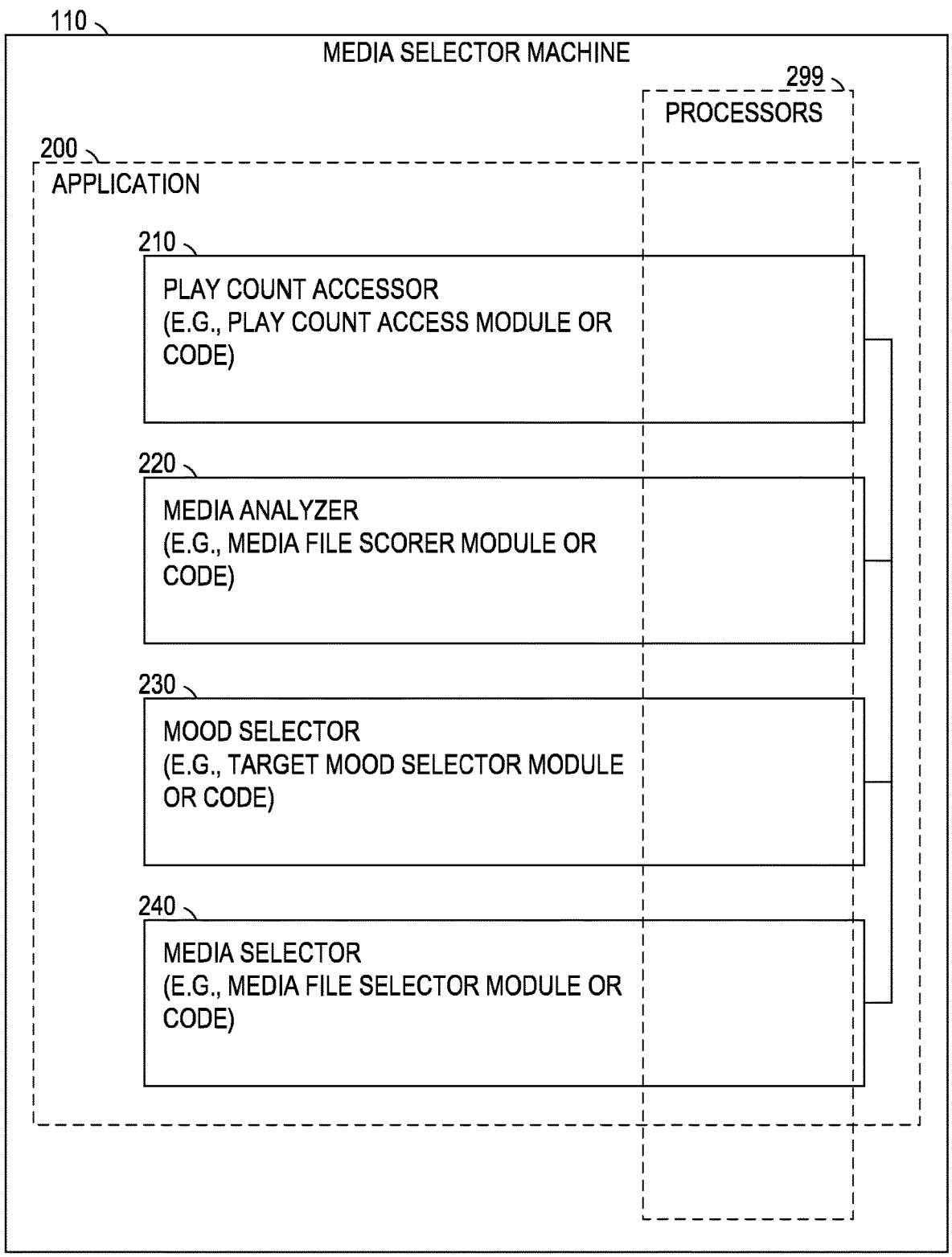
FIG. 2 is a block diagram illustrating components of an media selector machine suitable for machine-led mood change, according to some example embodiments.

FIG. 2 is a block diagram illustrating components of the media selector machine 110, according to some example embodiments. The media selector machine 110 is shown as including a play count accessor 210 (e.g., a play count access module or play count accessing code), a media analyzer 220 (e.g., a media file scorer module or media file scoring code), a mood selector 230 (e.g., a target mood selector module or target mood selecting code), and a media selector 240 (e.g., a media file selector module or media file selecting code), all configured to communicate with each other (e.g., via a bus, shared memory, or a switch).

As shown in FIG. 2, the play count accessor 210, the media analyzer 220, the mood selector 230, and the media selector 240 may form all or part of an application 200 that is stored (e.g., installed) on the media selector machine 110. Furthermore, one or more processors 299 (e.g., hardware processors, digital processors, or any suitable combination thereof) may be included (e.g., temporarily or permanently) in the application 200, the play count accessor 210, the media analyzer 220, the mood selector 230, the media selector 240, or any suitable combination thereof.

Figure 3:
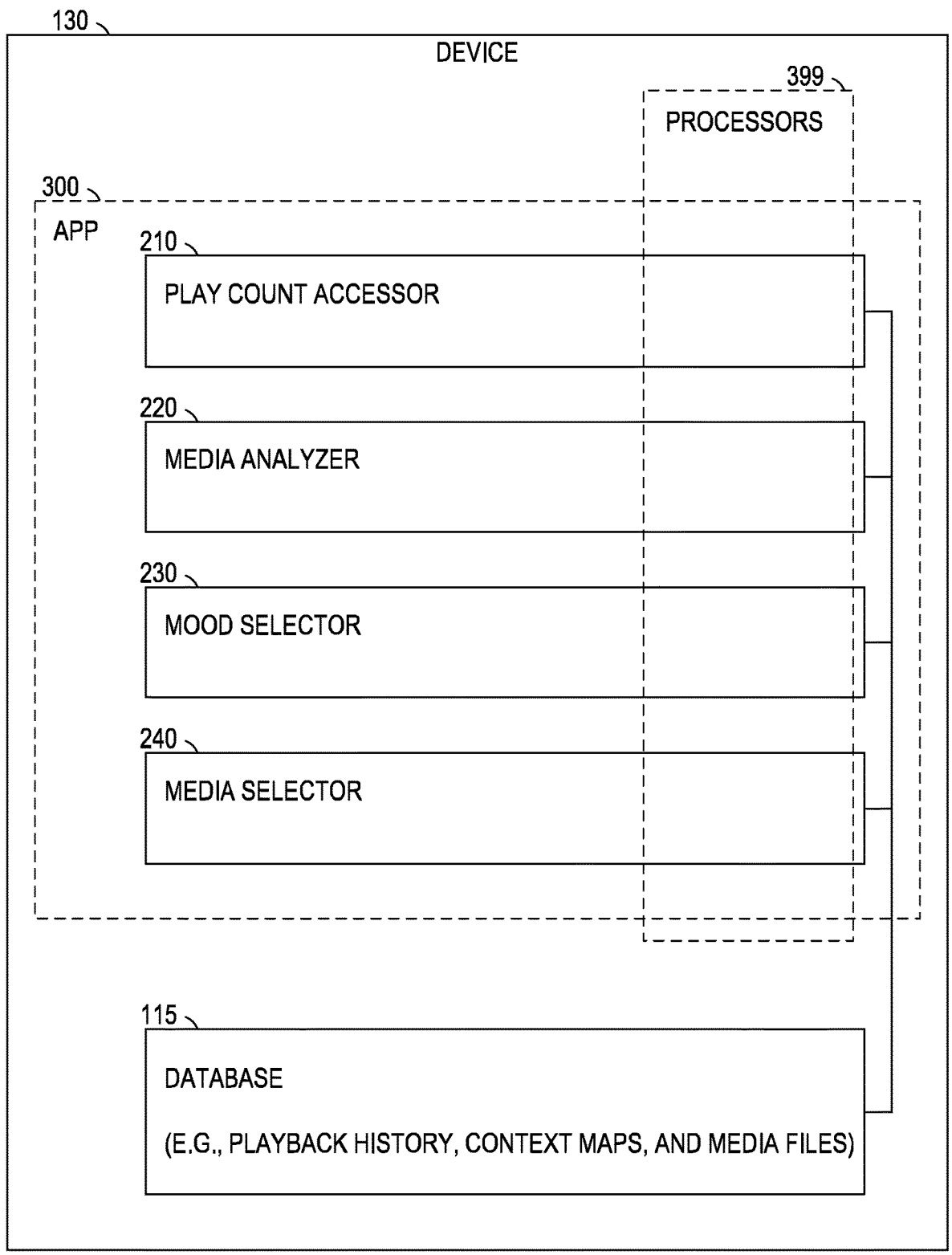
FIG. 3 is a block diagram illustrating components of a device suitable for machine-led mood change, according to some example embodiments.

FIG. 3 is a block diagram illustrating components of the device 130, according to some example embodiments. In accordance with such example embodiments, the device 130 is shown as including the play count accessor 210, the media analyzer 220, the mood selector 230, and the media selector 240, all configured to communicate with each other (e.g., via a bus, shared memory, or a switch). As shown in FIG. 3, the play count accessor 210, the media analyzer 220, the mood selector 230, and the media selector 240 may form all or part of an app 300 (e.g., a mobile app) that is stored (e.g., installed) on the device 130 (e.g., responsive to or otherwise as a result of data being received by the device 130 from the network-based system 105 via the network 190. Furthermore, one or more processors 399 (e.g., hardware processors, digital processors, or any suitable combination thereof) may be included (e.g., temporarily or permanently) in the app 300, the play count accessor 210, the media analyzer 220, the mood selector 230, the media selector 240, or any suitable combination thereof. In some example embodiments, the database 115 is stored by the device 130.

Figure 4:
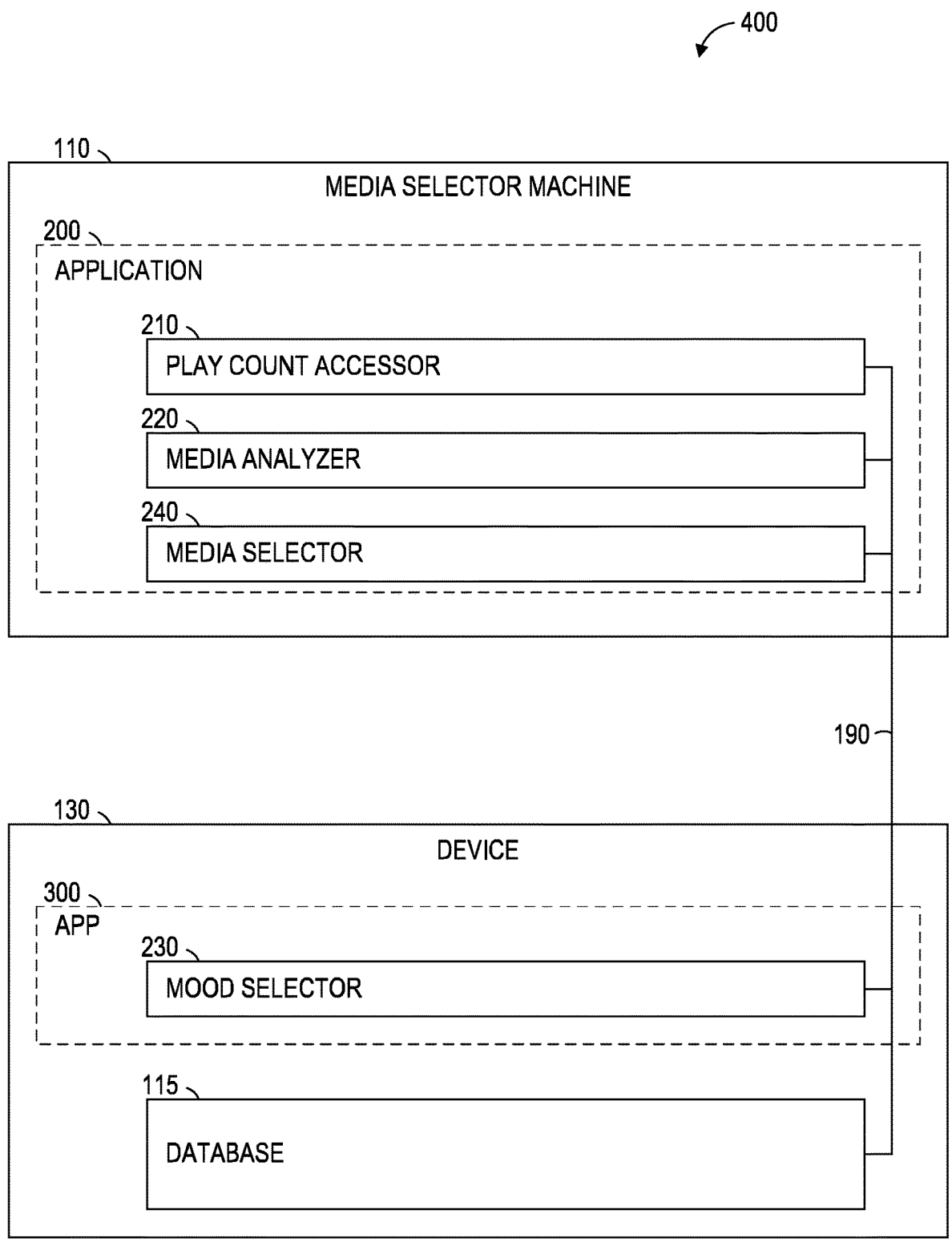
FIG. 4 is a block diagram illustrating components of a hybrid system suitable for machine-led mood change, according to some example embodiments.

FIG. 4 is a block diagram illustrating components of a hybrid system 400, according to some example embodiments. In accordance with such example embodiments, the media selector machine 110 and the device 130 cooperatively interoperate to perform one or more of the methodologies discussed herein. As shown in FIG. 4, the play count accessor 210, the media analyzer 220, and the media selector 240 may be included in the application 200, which may be installed and executing on the media selector machine 110, while the mood selector 230 (e.g., with or without the database 115) may be included in the app 300, which may be installed and executing on the device 130.

Considering FIGS. 2-4, any one or more of the components (e.g., modules) described herein may be implemented using hardware alone (e.g., one or more of the processors 299 or 399) or a combination of hardware and software. For example, any component described herein may physically include an arrangement of one or more of the processors 299 or 399 (e.g., a subset of or among the processors 299 or 399) configured to perform the operations described herein for that component. As another example, any component described herein may include software, hardware, or both, that configure an arrangement of one or more of the processors 299 or 399 to perform the operations described herein for that component. Accordingly, different components described herein may include and configure different arrangements of the processors 299 or 399 at different points in time or a single arrangement of the processors 299 or 399 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 5:
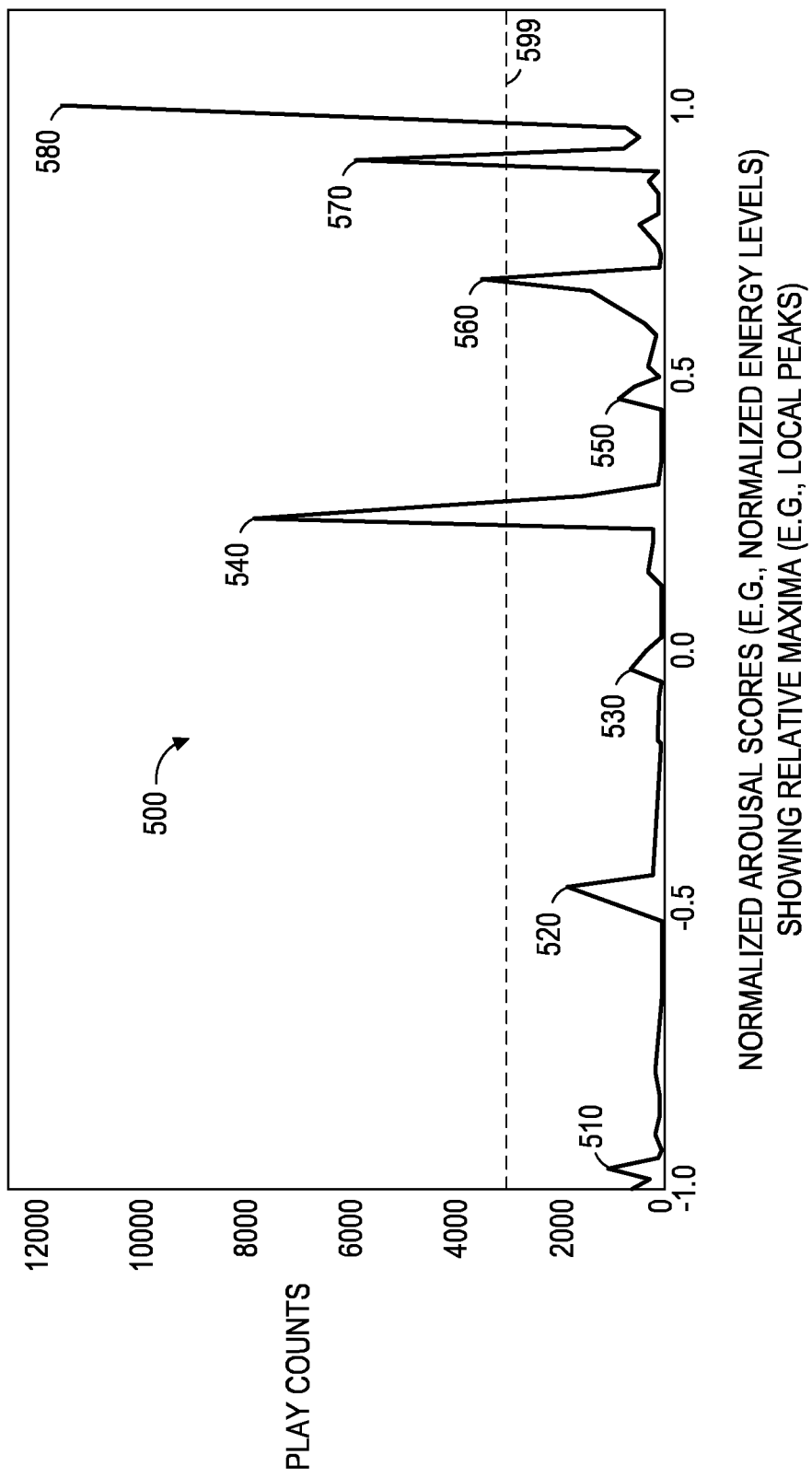
FIG. 5 is a graph illustrating a distribution of play counts over arousal scores of media files, according to some example embodiments.

FIG. 5 is a graph illustrating a distribution 500 of play counts over arousal scores (e.g., normalized arousal scores) of media files, according to some example embodiments. The arousal scores may be normalized to a predetermined range of arousal values (e.g., from −1.0 to 1.0). The play counts quantify playbacks (e.g., full playbacks or partial playbacks, including partial playbacks extending beyond a threshold duration, such as thirty seconds) of media files that have been played for the user 132, the user 152, or both. In some example embodiments, the play counts specifically quantify instances in which the device 130 itself performed such playbacks (e.g., at the specific request of the user, as part of playing a user-edited playlist, as part of playing a streaming radio station, or any suitable combination thereof). In certain example embodiments, the play counts specifically quantify instances in which the device 130 recognized or otherwise detected such playbacks (e.g., via an audio identifier configured to perform live audio recognition or other audio identification) occurring for the user (e.g., occurring in ambient sounds played by an external device and detected by a microphone of the device 130). In hybrid example embodiments, the play counts quantify both performed and detected playbacks.

The distribution 500, in the example shown in FIG. 5, is or includes a mapping of play counts to corresponding arousal scores. Accordingly, the distribution 500 may be thought of as a "spread" or other data structure that correlates arousal scores to play counts of media files that have those arousal scores. As noted above, although most example embodiments discussed herein, for clarity, are described as using arousal scores (e.g., according to the PAD model of emotional states), various example embodiments of the methods and systems described herein may use arousal scores, pleasantness scores, dominance scores, or any suitable combination thereof.

As shown in FIG. 5, the distribution 500 may be visualized as a graph, though in various example embodiments, the distribution 500 is stored as an array of values (e.g., value pairs, such as pairings of play counts to their corresponding arousal scores) with or without a visual representation being generated or presented. FIG. 5 depicts the distribution 500 as having multiple relative maxima 510, 520, 530, 540, 550, 560, 570, and 580 (e.g., local peaks in the distribution 500). Each relative maximum (e.g., local peak) corresponds to a different arousal score (e.g., a different normalized arousal score), and represents an arousal score for media files that are familiar to the user 132, the user 152, or both, in the sense that each of the relative maxima 510-580 corresponds to a relatively high play count compared to neighboring arousal scores in the distribution 500.

FIG. 5 also shows a threshold play count 599 (e.g., predetermined threshold count or predetermined threshold play count) above which some relative maxima 540, 560, 570, and 580 are distinguishable as large local peaks (e.g., large enough for further processing). Accordingly, the threshold play count 599 may be used (e.g., by the media selector machine 110 or the device 130) to filter out the smaller relative maxima 510, 520, 530, and 550, identify the larger relative maxima 540, 560, 570, and 580, or both. In some example embodiments, the threshold play count 599 is expressed as an integer value (e.g., 50 playbacks), while in other example embodiments, the threshold play count 599 is expressed as a percentage of total playbacks (e.g., 2%). In certain example embodiments, the threshold play count 599 is expressed as a percentage (e.g., 15%) of the largest relative maximum (e.g., the relative maximum 580). In alternative example embodiments, the threshold play count 599 is expressed as an average of the relative maxima 510, 520, 530, 540, 560, 570, and 580, or a percentage of the average.

Figure 6:
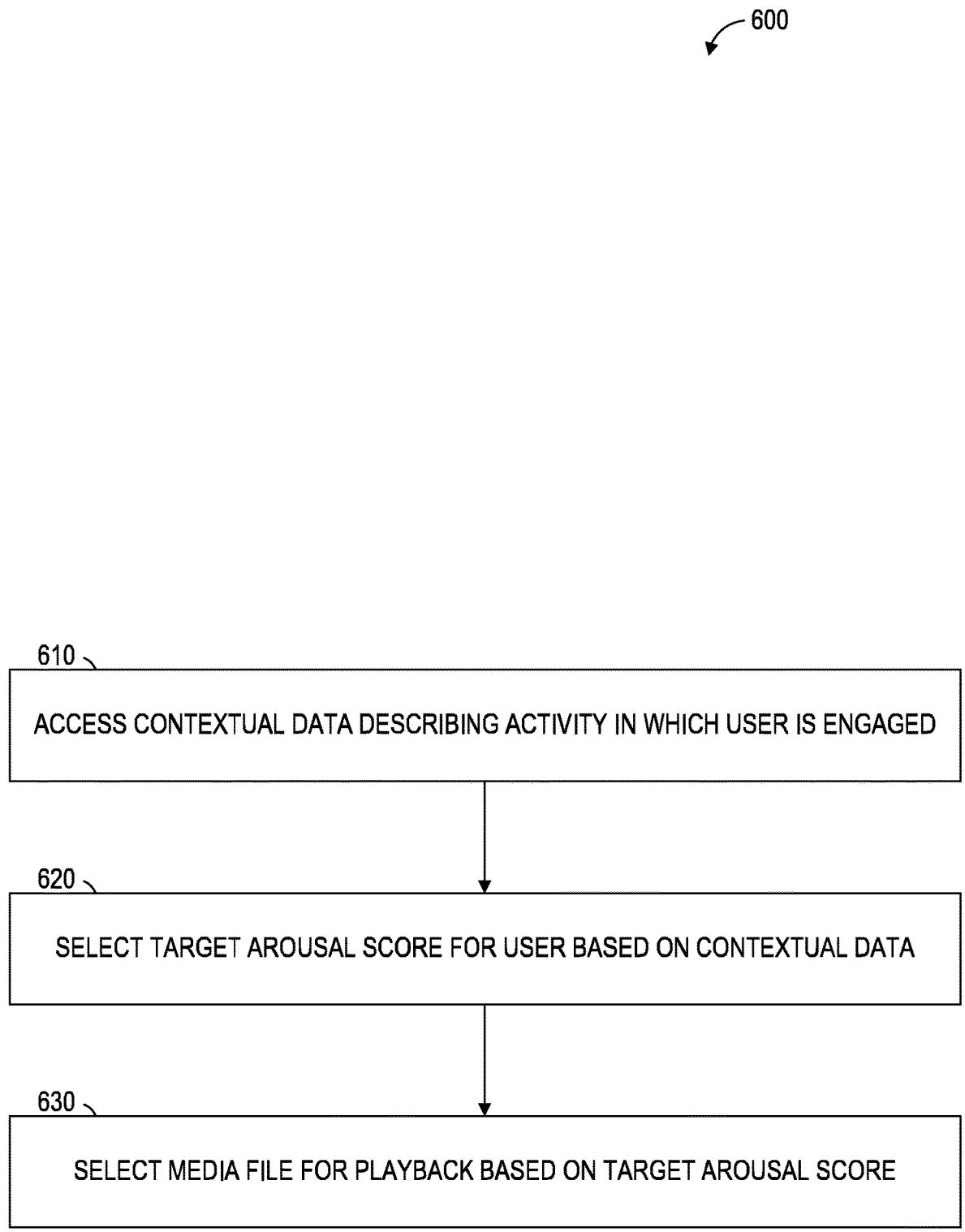
FIGS. 6-9 are flowcharts illustrating operations of the media selector machine, the device, or any suitable combination thereof, in performing a method of selecting a media file suitable for machine-led mood change, according to some example embodiments.

FIGS. 6-9 are flowcharts illustrating operations of the media selector machine 110, the device 130, or any suitable combination thereof (e.g., the hybrid system 400), in performing a method 600 of selecting a media file suitable for machine-led mood change, according to some example embodiments. Operations in the method 600 may be performed by the media selector machine 110, the device 130, or both cooperatively (e.g., as the hybrid system 400), using components (e.g., modules) described above with respect to FIGS. 2-4, using one or more processors (e.g., microprocessors or other hardware processors), or using any suitable combination thereof. As shown in FIG. 6, the method 600 includes at least operations 610, 620, and 630.

In operation 610, the mood selector 230 accesses contextual data that fully or partially describes an activity in which at least the user 132 is engaged (e.g., driving the vehicle 135 to work, to home, or to an entertainment venue, such as a restaurant, theater, or concert hall). The user 152 may also be engaged in the activity described by the contextual data. As described in further detail below, the contextual data that describes this activity may be accessed (e.g., received) from one or more sensors (e.g., the sensors 131 within the vehicle 135).

In operation 620, the mood selector 230 selects a target arousal score (e.g., corresponding to a target mood, target emotional state, target physical state, or any suitable combination thereof) for at least the user 132. In some example embodiments, the target arousal score is selected for both the user 132 and the user 152. The target arousal score may be selected from the database 115, which may be or include a context map database that stores context maps correlating activities to target arousal scores (e.g., a list of activities, with each activity mapped to a corresponding target arousal score). For example, the database 115 may contain a record that correlates the activity described by the contextual data accessed in operation 610 to a particular corresponding target arousal score, and based on this correlation, the mood selector 230 may select that particular corresponding target arousal score in performing operation 620. Accordingly, the target arousal score selected in operation 620 is selected based on the contextual data accessed in operation 610 (e.g., based on the activity that is described by the contextual data accessed in operation 610). In some example embodiments, the selection of the target arousal score in operation 620 includes generating (e.g., calculating) the target arousal score based on some or all of the contextual data accessed in operation 610, which may contrast with selection (e.g., from the database 115) of a pre-generated target arousal score already assigned to the activity described by the contextual data.

In some example embodiments of the method 600, the mood selector 230 selects the target arousal score by receiving or otherwise detecting the target arousal score and selected or otherwise submitted by the user 132 and using the user-selected target arousal score (e.g., as submitted or with modifications) in operation 620. For example, the mood selector 230 may cause the user 132 to be presented with a prompt or other user interface that allows the user 132 to directly select the target arousal score, and the mood selector 230 may adopt the user-selected target arousal score as submitted or use the user-selected target arousal score a basis for actively selecting a different target arousal score.

In operation 630, the media selector 240 selects a media file for playback to at least the user 132 (e.g., the user 132 alone, the users 132 and 152, or every person within the vehicle 135). The selecting of the media file is based on the target arousal score selected in operation 620. As discussed in further detail below, the media file selected in operation 630 may be selected from among a group (e.g., collection or library) of familiar media files previously played for the user 132 (e.g., media files having play counts above a threshold number of playbacks) or selected from among a group of unfamiliar media files that either have not been previously played for the user 132 (e.g., media files having play counts equal to zero with respect to the user 132) or have seldom been played for the user 132 (e.g., media files having play counts below a threshold number of playbacks).

Figure 7:
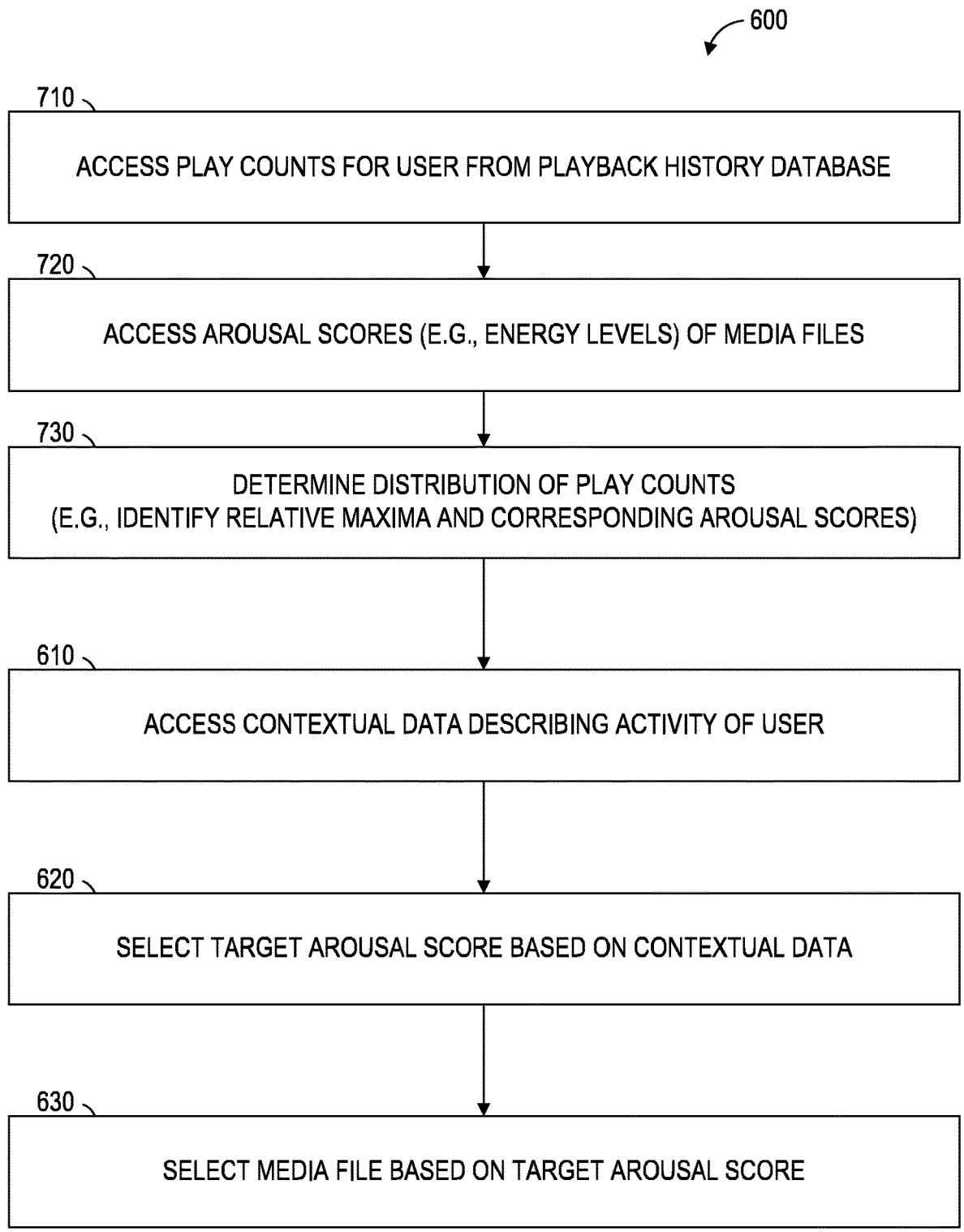

As shown in FIG. 7, in addition to any one or more of the operations previously described, the method 600 may include one or more of operations 710, 720, and 730. One or more of operations 710-730 may be performed prior to the one or more of operations 610-630 and thus may influence one or more of operations 610-630. For example, any one or more of operations 610, 620, 630 may be performed based on one or more results from performing one or more of operations 710, 720, and 730.

In operation 710, the play count accessor 210 accesses play counts that quantify playbacks of a set of media files played for the user 132 (e.g., the driver of the vehicle 135). As noted above, the play counts may quantify full playbacks, partial playbacks (e.g., partial playbacks beyond a threshold duration), or any suitable combination thereof. Furthermore, the play counts may quantify playbacks performed by the device 130, performed by another device (e.g., an external device), or any suitable combination thereof. According to various example embodiments, the play counts may be accessed from the database 115, which may be or include a playback history database that stores a playback history corresponding to the user 132 (e.g., a list of identifiers for each media file in the set of media files, with each identifier mapped to a corresponding play count).

In operation 720, the media analyzer 220 accesses arousal scores of the same set of media files played for the user 132 (e.g., the driver of the vehicle 135). In some example embodiments, the accessing of the arousal scores includes retrieving the arousal scores from the database 115, which may be or include a media file database that stores arousal scores (e.g., as metadata) for the set of media files (e.g., a list of identifiers for each media file in the set of media files, with each identifier mapped to a corresponding arousal score).

In operation 730, the media analyzer 220 determines the distribution 500 of play counts (e.g., the spread of the play counts from operation 710 over the arousal scores from operation 720). The media analyzer 220 may generate the distribution 500 (e.g., in memory) based on the play counts accessed in operation 710 and the arousal scores accessed in operation 720. As noted above, the distribution 500 indicates relative maxima (e.g., relative maximum play counts) 510-580 that each correspond to a different arousal score in the distribution 500.

In example embodiments that include operation 730, the selecting of the target arousal score in operation 620 (e.g., based on the contextual data) may be performed based on the distribution 500 that was determined in operation 730. As discussed in further detail below, the target arousal score selected in operation 620 may be selected based on one or more of the relative maxima 510-580 (e.g., local peaks) present in the distribution 500.

Figure 8:
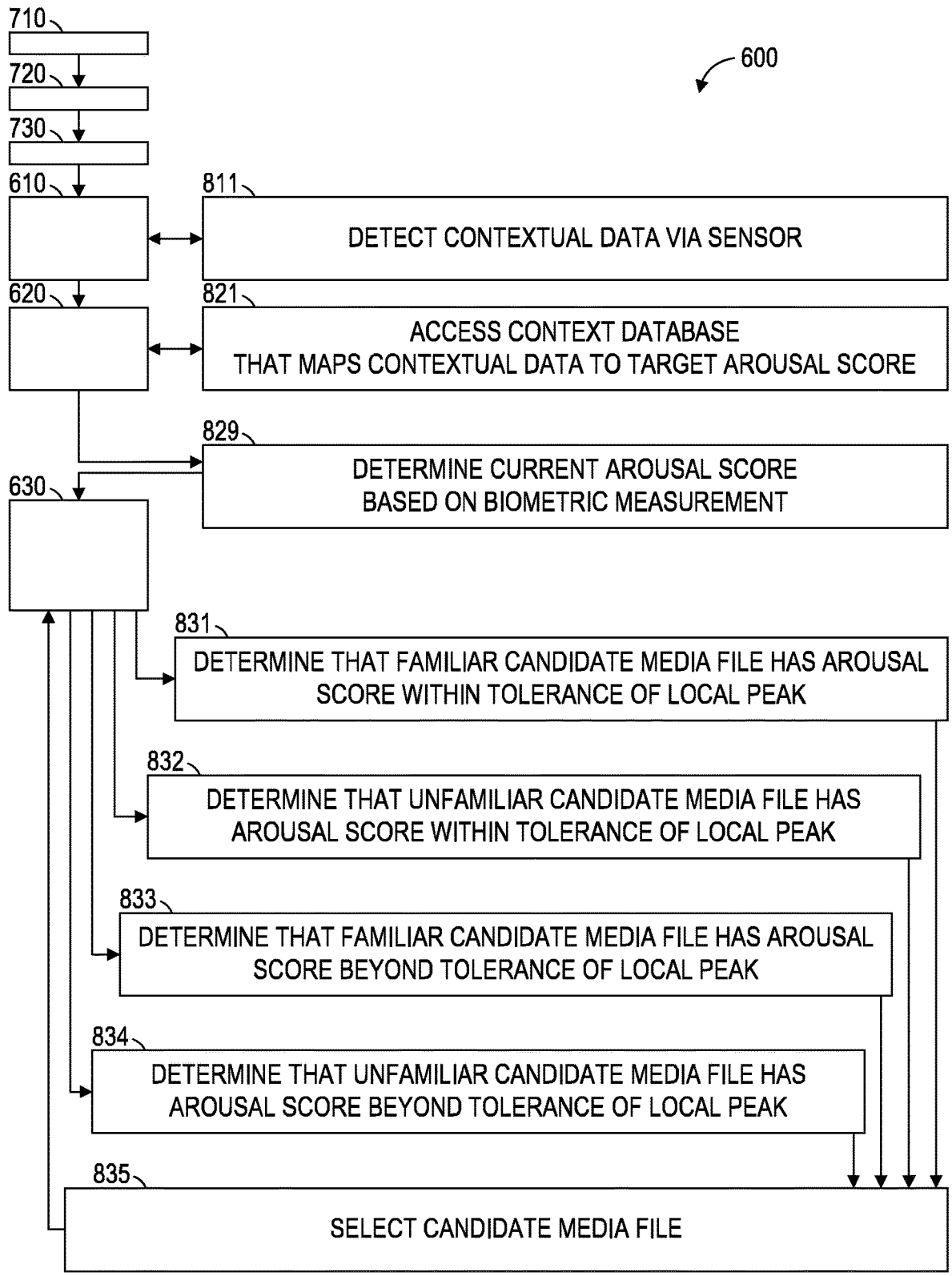

As shown in FIG. 8, some example embodiments of the method 600 include one or more of operations 811, 821, 829, 831, 832, 833, 834, and 835. Operation 821 may be performed as part (e.g., a precursor task, a subroutine, or a portion) of operation 610, in which the mood selector 230 accesses the contextual data that describes the activity in which at least the user 132 is engaged.

In operation 811, the mood selector 230 accesses the contextual data by detecting (e.g., receiving) the contextual data via the one or more sensors 131 in the vehicle 135. Detected in this manner, the contextual data may indicate one or more measurements (e.g., biometric measurements taken of the user 132 or biometrically related measurements taken of the vehicle 135)) or other indicators obtainable from the sensors 131. Examples of such measurements include measurements of a force (e.g., a pressure force or a weight force) applied by the user 132 to a portion (e.g., region) of a seat (e.g., a car seat) within the vehicle 135 (e.g., as indicator of posture), a frequency at which the force applied to the portion of the seat fluctuates (e.g., as an indicator of calmness, drowsiness, or agitation), a duration of a blink of an eye of the user 132 (e.g., as indicator of alertness or drowsiness), a frequency at which the eye of the user 132 moves (e.g., as an indicator of alertness or drowsiness), a blood glucose level of the user 132 (e.g., as an indicator of a physical state), a heart rate of the user 132 (e.g., as an indicator of calmness, drowsiness, or agitation, or of a physical state), a frequency at which the heart rate of the user 132 fluctuates, a galvanic skin response of the user 132 (e.g., as an indicator of confidence or nervousness), a force applied by the user 132 to a portion (e.g., section) of a steering wheel of the vehicle 135 (e.g., as an indicator of drowsiness, aggression, confidence, or nervousness), a frequency at which the force applied to the portion of the steering wheel fluctuates (e.g., as an indicator of drowsiness or lack thereof), a frequency at which a brake pedal of the vehicle 135 is pressed by the user 132 (e.g., as an indicator of confidence, nervousness, or traffic conditions), a speed of the vehicle 135 (e.g., as indicator of confidence, nervousness, drowsiness, or traffic conditions), a frequency at which the vehicle 135 changes direction (e.g., as an indicator of confidence, nervousness, drowsiness, aggression, or traffic conditions), an electroencephalogram of the user 132, an electrocardiogram of the user 132, and any suitable combination thereof.

Operation 821 may be performed as part of operation 620, in which the mood selector 230 selects the target arousal score for at least the user 132. In operation 821, the mood selector 230 accesses the database 115, which may correlate the activity described by the contextual data to a particular corresponding target arousal score (e.g., a candidate target arousal score that may be selected or modified to perform the ultimate selection of the target arousal score in operation 620). In some example embodiments, the mood selector 230 selects the target arousal score directly from the database 115 (e.g., from a context map stored in the database 115). In certain example embodiments, the mood selector 230 selects the target arousal score based on information (e.g., a candidate target arousal score) accessed from the database 115. For example, as described in further detail below, the mood selector 230 may choose a target arousal score that is between a current arousal score of the user 132 (e.g., as determined from some or all of the contextual data) and a candidate target arousal score that the database 115 has correlated with the contextual data (e.g., correlated with the activity that is described by the contextual data).

As shown in FIG. 8, operation 829 may be performed at any point prior to operation 630, in which the media selector 240 selects the media file to be played for at least the user 132. In operation 829, the mood selector 230 determines a current arousal score of at least the user 132 (e.g., the user 132 alone, the users 132 and 152, or all persons riding in the vehicle 135) based on some or all of the contextual data accessed in operation 610 (e.g., detected via the one or more sensors 131 in operation 811). Accordingly, in some example embodiments, operation 829 is performed based on the results of operation 811, while in alternative example embodiments, operation 829 includes operations 610, operation 811, or both, and in further example embodiments, operation 829 is performed as part of operation 610 (e.g., after operation 811).

In example embodiments that include operation 829, one or both of operations 620 and 630 may be performed based on the results of operation 829. For example, the target arousal score selected in operation 620 is selected based on the contextual data accessed in operation 610, and this selection may be further based on the current arousal score determined in operation 829. As another example, the media file selected in operation 630 is selected based on the target arousal score, and this selection may be further based on the current arousal score determined in operation 829.

As further shown in FIG. 8, one or more of operations 831, 832, 833, 834, and 835 may be performed as part of operation 630, in which the media selector 240 selects the media file for playback to at least the user 132. As shown by arrows in FIG. 8, multiple media files can be selected by repetition of operation 630, and any specific repetition of operation 630 can include performance of operations 831 and 835, operations 832 and 835, operation 833 and 835, or operations 834 and 835.

In operation 831, the media selector 240 determines that a candidate media file among the set of media files previously played for the user 132 has a candidate arousal score within a threshold tolerance (e.g., inside a predetermined threshold difference in arousal scores) of an arousal score that corresponds to a relative maximum (e.g., the relative maximum 540 or the relative maximum 580) in the distribution 500. This may have the effect of identifying a candidate media file that is familiar to the user 132 and has an arousal score similar to an energy level that is also familiar to the user 132. Accordingly, subsequent operation 835 may be performed by the media selector 240 to select this candidate media file (e.g., based on the candidate arousal score being inside the threshold tolerance of the arousal score of the relative maximum) and thereby select a familiar media file with a familiar energy level for playback to the user 132.

In operation 832, the media selector 240 determines that a candidate media file within a group of media files (e.g., a media library from which the set of media files previously played for the user 132 is absent) has a candidate arousal score within a threshold tolerance (e.g., inside a predetermined threshold difference in arousal scores) of an arousal score that corresponds to a relative maximum (e.g., the relative maximum 540 or the relative maximum 580) in the distribution 500. In situations where the group of media files has no overlap with the set of media files previously played for the user 132, this may have the effect of identifying a candidate media file that is unfamiliar to the user 132 but has an arousal score similar to an energy level that is indeed familiar to the user 132. Accordingly, subsequent operation 835 may be performed by the media selector 240 to select this candidate media file (e.g., based on the candidate arousal score being inside the threshold tolerance of the arousal score of the relative maximum) and thereby select an unfamiliar media file with a familiar energy level for playback to the user 132.

In operation 833, the media selector 240 determines that a candidate media file among the set of media files previously played for the user 132 has a candidate arousal score beyond a threshold tolerance (e.g., outside a predetermined threshold difference in arousal scores) of an arousal score that corresponds to a relative maximum (e.g., the relative maximum 540 or the relative maximum 580) in the distribution 500. This may have the effect of identifying a candidate media file that is familiar to the user 132 but has an arousal score dissimilar to energy levels that are familiar to the user 132. Accordingly, subsequent operation 835 may be performed by the media selector 240 to select this candidate media file (e.g., based on the candidate arousal score being outside the threshold tolerance of the arousal score of the relative maximum) and thereby select a familiar media file with an unfamiliar energy level for playback to the user 132.

In operation 834, the media selector 240 determines that a candidate media file within a group of media files (e.g., a media library from which the set of media files previously played for the user 132 is absent) has a candidate arousal score beyond a threshold tolerance (e.g., outside a predetermined threshold difference in arousal scores) of an arousal score that corresponds to a relative maximum (e.g., the relative maximum 540 or the relative maximum 580) in the distribution 500. In situations where the group of media files has no overlap with the set of media files previously played for the user 132, this may have the effect of identifying a candidate media file that is unfamiliar to the user 132 and also has an arousal score dissimilar to energy levels that are familiar to the user 132. Accordingly, subsequent operation 835 may be performed by the media selector 240 to select this candidate media file (e.g., based on the candidate arousal score being outside the threshold tolerance of the arousal score of the relative maximum) and thereby select an unfamiliar media file with an unfamiliar energy level for playback to the user 132.

In operation 835, as noted above, the media selector 240 selects the candidate media file determined in either operation 831, operation 832, operation 833, or operation 834. The selection of the candidate media file may include adding an identifier of the candidate media file to a playlist, initiating a playback of the candidate media file (e.g., as the selected media file), causing presentation of a suggestion that the candidate media file be played, or any suitable combination thereof.

Figure 9:
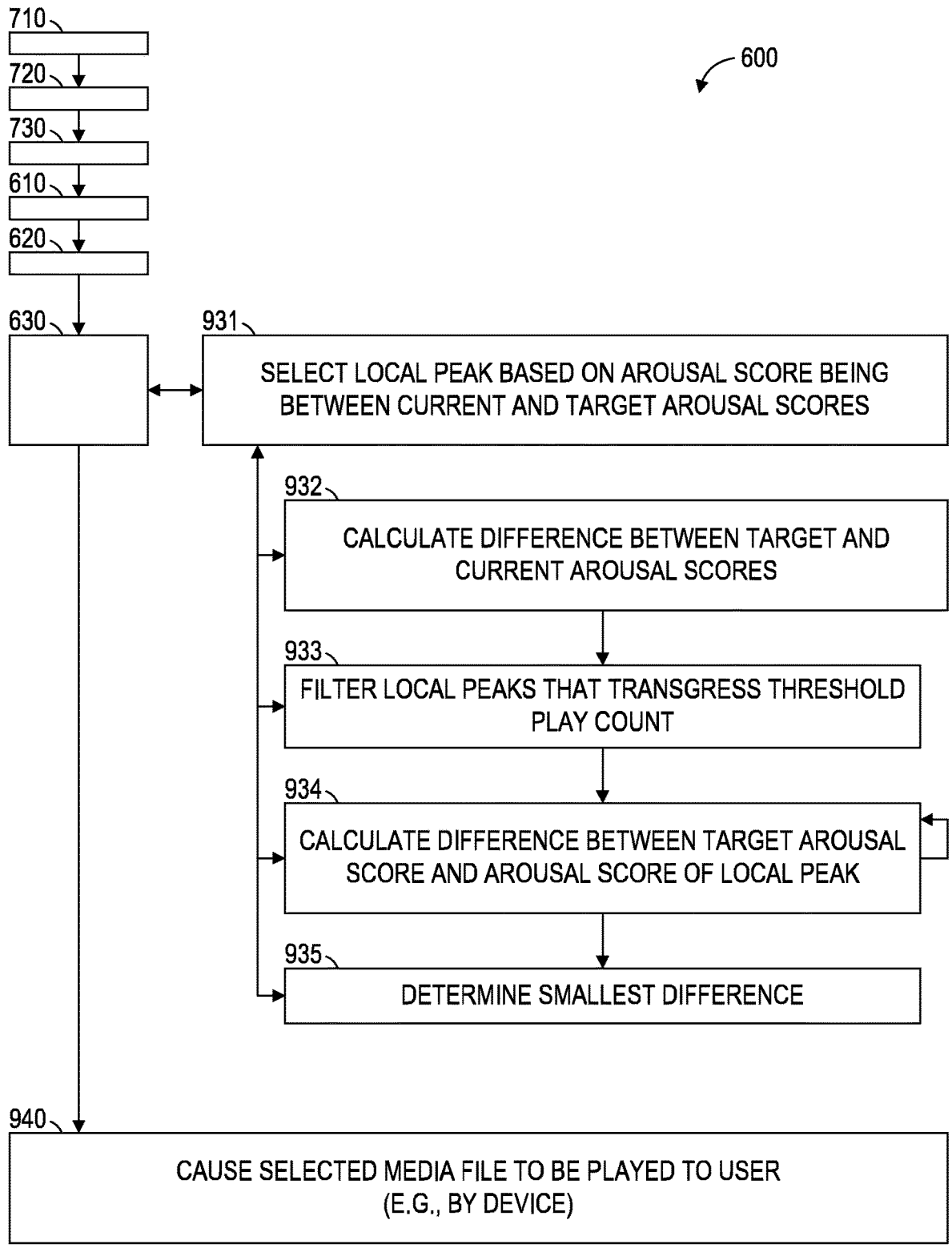

As shown in FIG. 9, some example embodiments of the method 600 include one or more of operations 931, 932, 933, 934, 935, and 940. Operation 931 may be performed as part of operation 630, in which the media selector 240 selects the media file to be played to at least the user 132. In operation 931, the media selector 240 selects (e.g., chooses or otherwise identifies as being selected) the relative maximum 540 (e.g., as an example of a local peak) in the distribution 500. According to various example embodiments, performance of operation 931 may include selecting the relative maximum 540 (e.g., directly), its corresponding arousal score (e.g., from the distribution 500), or any suitable combination thereof.

The selection of the relative maximum 540 in operation 931 is based on the target arousal score that was selected in operation 620 and may be further based on the current arousal score that was determined in operation 829. For example, the selecting of the relative maximum 540 may be based on its corresponding arousal score being between the current arousal score and the target arousal score. In other words, the target arousal score may be treated as an ultimate target arousal score, and the media selector 240 may select an intermediate target arousal score somewhere between the ultimate target arousal score and the current arousal score. This may have the effect of enabling incremental steps to be taken in machine-led mood change. Further details and options are described presently with respect to operations 932, 933, 934, and 935, any one or more of which may be performed as part of operation 931.

In operation 932, the media selector 240 calculates a difference between the target arousal score (e.g., the ultimate target arousal score) selected in operation 620 and the current arousal score determined in operation 829. In example embodiments that include operation 932, the selecting of the relative maximum 540 in operation 931 is based on the calculated difference between the target arousal score and the current arousal score.

In operation 933, the media selector 240 filters the relative maxima 510-580 in the distribution 500 according to the threshold play count 599. For example, the media selector 240 may compare the play counts of the relative maxima 510-580 to the threshold play count 599, determine that the play count for the relative maximum 540 (e.g., among other play counts for other relative maxima, such as the relative maxima 560, 570, and 580) transgresses the threshold play count 599, and select the arousal score that corresponds to the relative maximum 540 (e.g., the arousal score that corresponds to the play count for the relative maximum 540). The selection of this arousal score is based on the play count of the relative maximum 540 transgressing the threshold play count 599. This may have the effect of removing the relative maxima 510, 520, 530, and 550 from consideration in the selecting of the relative maximum 540 from those relative maxima (e.g., relative maxima 540, 560, 570, and 580) whose corresponding play counts transgress the threshold play count 599. As a result, only sufficiently large local peaks in the distribution 500 are used to select an intermediate target arousal score (e.g., between the current arousal score and the ultimate target arousal score) in operation 931.

In operation 934, the media selector 240 calculates a difference between the arousal score of the relative maximum 540 (e.g., the arousal score of a local peak) in the distribution 500 and the target arousal score being used in operation 931 (e.g., an ultimate target arousal score from operation 620 or an intermediate target arousal score between the ultimate target arousal score and the current arousal score). This may have the effect of measuring a mathematical distance between the arousal score of the relative maximum 540 and the target arousal score. As shown in FIG. 9, this operation may be repeated to find similar mathematical distances between the target arousal score and the arousal scores of other relative maxima (e.g., relative maxima 560, 570, and 580) in the distribution 500.

Accordingly, the media selector 240 can determine which one of the relative maxima (e.g., relative maxima 540, 560, 570, and 580) is the closest to the target arousal score (e.g., which relative maximum has the smallest difference between its corresponding arousal score and the target arousal score). This determination (e.g., by comparison of differences) is performed by the media selector 240 in operation 935. That is, in operation 935, the media selector 240 determines the smallest difference among the differences between the target arousal score and each of the arousal scores that correspond to the filtered relative maxima 540, 560, 570, and 580. As a result, the media selector 240 may determine that the relative maximum 540 has an arousal score that is closest to the target arousal score.

As shown in FIG. 9, operation 940 may be performed at any point after operation 630, in which the media selector 240 selects the media file to be played. In operation 940, the media selector 240 causes the media file selected in operation 630 to be played to at least the user 132 (e.g., the user 132 specifically, the users 132 and 152, or all occupants of the vehicle 135). For example, the media selector 240 may cause (e.g., command or control) the device 130 to initiate a playback of the selected media file. As another example, the media selector 240 may cause the device 130 to select a streaming music service (e.g., by selecting a corresponding data stream) that is playing the selected media file, such that the selected media file is played by the device 130. As a further example, the media selector 240 may cause one or more external devices (e.g., wearable devices on one or more of the users 132 and 152, or a vehicle device built into the vehicle 135) to initiate a playback of the selected media file.

Consistent with the above-described example embodiments, performance of the method 600 can stimulate a sleepy driver (e.g., user 132) in situations where a biometric measurement of the driver (e.g., from operation 811) indicates that the driver is drowsy and where the contextual data (e.g., from operation 811) indicates that the activity in which the driver is engaged is driving a vehicle (e.g., vehicle 135). In such a situation, the selected target arousal score (e.g., from operation 620 or operation 931) and the arousal score that corresponds to the relative maximum 540 (e.g., from operation 931) may both be higher than the current arousal score (e.g., from operation 829). Accordingly, the selecting of the media file in operation 630 may be based on the arousal score that corresponds to the relative maximum 540 being higher than the current arousal score.

Conversely, performance of the method 600 can calm an agitated or aggressive driver (e.g., user 132) in situations where the biometric measurement of the driver (e.g., from operation 811) indicates that the driver is agitated or aggressive and where the contextual data (e.g., from operation 811) indicates that the activity in which the driver is engaged is driving a vehicle (e.g., vehicle 135). In such a situation, the selected target arousal score (e.g., from operation 620 or operation 931) and the arousal score that corresponds to the relative maximum 540 may both be lower than the current arousal score (e.g., from operation 829). Accordingly, the selecting of the media file in operation 630 may be based on the arousal score that corresponds to the relative maximum 540 being lower than the current arousal score.

In addition, consistent with the above-described example embodiments, a machine may be configured to select an appropriate musical mood from which to select media files for playback within a vehicle, based on the current mood of one or more vehicle occupants (e.g., the driver, one or more passengers, or any suitable combination thereof), a destination, one or more driving conditions, or any other criterion associated with the current emotional state of the driver. While the following techniques are discussed in the example context of automobiles, the techniques are not so limited and may be applied to other example contexts, such as wearable devices or smart home components (e.g., smart lightbulbs).

Examples of data that may be utilized in the techniques described below include: braking data (e.g., intensity, frequency, or duration), acceleration data (e.g., from rest, while passing, or in turns), turning data (e.g., sharpness, speed during turns, or steering corrections), stability (e.g., lane drift), distance (e.g., proximity) to other cars (e.g., tailgating), headlight data (e.g., ambient light before activation of headlights or use of high beams), turn signal data (e.g., frequency of use), windshield wiper data (e.g., frequency, duration, or use of delay), climate data (e.g., temperature settings, heater use, or air-conditioner use), seat position data, general driving data (e.g., gear usage, average speed, mileage between refuelings, or time between refuelings), and trip data (e.g., average distance, average duration, or frequent locations visited).

In some example embodiments, one or more sensors in an automobile provide at least the above data during operation. Different automobiles may have different sets of sensors configured to detect and provide the data, and the data may be transmitted to a mobile computing device (e.g., a cellphone) or stored on a local device (e.g., a car head unit). In some example embodiments, the data is processed on the cellphone, transmitted to a server for processing, or a combination of both. The data is analyzed and particular identifying portions of the data are identified (e.g., sharpness of changes in particular sensor data). This data is condensed into a descriptive identifier that may be utilized, for example, to identify a particular driver. In an example, this descriptive identifier may include alphanumeric characters, waveforms, or other types of human-readable or machine-readable data that describe entire or partial signal data from one or more sensors. In one sense, the condensed data may be thought of as a "driving fingerprint" that is used to identify a driver based on characteristics of driving as identified by the sensor data. Selected portions of various signals communicated by the sensors may be used as part of the fingerprinting process, and different sensor data may be used for different fingerprints. For example, one driver may always accelerate hard from rest, and another driver accelerate gently from rest. This particular difference may be identified in the sensor data and used (e.g., along with other data) to identify when a particular driver is driving the car. In some example embodiments, a reference driving fingerprint for a driver may be generated over time by analyzing and processing the sensor data. A "training mode" may be activated in which a fingerprint is explicitly built based on driving data as a result of activating the training mode, and this fingerprint may be utilized as the reference fingerprint. Reference fingerprints may be stored on a device, uploaded to a server, or both, and may be compared to a fingerprint generated based on current driving data.

In the previous example of differently accelerating drivers, the hard-accelerating driver and the gently accelerating driver each may have a reference fingerprint stored on a server. Once the car is started and driving begins, sensor data is accumulated, analyzed, and processed to create a query fingerprint. Once a threshold level of data has been gathered, the query fingerprint may be compared to the reference fingerprints to identify the current driver based on the currently-driving individual's characteristics. For example, once a threshold level of acceleration data has been gathered, an identification of the driver via fingerprinting techniques may be performed. In some example embodiments, various portions of sensor data may be excluded from the fingerprint approach (e.g., isolated incidents such as car accidents). According to various embodiments, a fingerprint for a particular user is associated with a music profile of the user (e.g., a taste profile that indicates the user's music preferences). In some example embodiments, the music profile is stored on a server and associated with the user, while in other embodiments the profile is stored on a device, or a combination of both. The music profile may exist independently of the driving fingerprint and may be generated by monitoring music listened to by a user (e.g., via a cellphone). The monitoring may be of ambient audio and may identify particular tracks, such as by an audio fingerprinting approach or via metadata. One or more portions of the music profile may be established dynamically and linked to a driving fingerprint profile. One or more portions of the music profile may already exist and be linked to the driving fingerprint profile.

Content information (e.g., genre, era, and mood) of the content played by a content station can be aggregated to determine a respective profile that describes the type or types of content (e.g., music) that are generally played by the content station. For example, the profile may indicate which portions of the content played by the content station correspond to a particular genre, era, or mood. According to some example embodiments, a selection of an appropriate music mood (e.g., which music to select for playing) is based on the current mood and driving information (e.g., current state of a driver, planned destination, current states of one or more passengers, or any suitable combination thereof). In some example embodiments, a current mood for a driver may be estimated by receiving data from one or more sensors (e.g., biometric sensors), in addition to data provided by the user. Examples of sensor data (e.g., biometric sensor data) include heart rate, eye-tracking data, interaction with the vehicle (e.g., steering corrections or braking), microphone data (e.g., to detect whether the driver is speaking or to detect acoustic aspects of the driver's voice), and galvanic skin response (e.g., resultant from sweating).

In an example use case, a driver may be driving to work and wish to arrive refreshed. In another example use case, a driver may be driving to a party and wish to arrive in an excited alert state. In another example use case, a driver may be nodding off at the wheel or on a long, boring trip, and a suitable music selection may contribute to the driver's state of alertness. By influencing a driver's mood, emotional state, physical state, or any suitable combination thereof, through selection of appropriate audio based on driver state, destination, traffic, challenge of the driving situation, estimated confidence of the driver, or any suitable combination thereof, various benefits of the techniques described herein may be accomplished.

In some example embodiments, a particular driver's habits are determined, stored, and analyzed. For example, a driver may travel from point A to point B every weekday morning around a certain time and via a certain route. By analyzing data associated with point A and point B (e.g., global positioning system (GPS) data), address book data, calendar data, or any suitable combination thereof, it may be determined that point A is the driver's home and point B is the driver's workplace. Reverse geolocation may also be used (e.g., getting a street address from GPS coordinates). Similar approaches may be used to determine other habits of the driver. The patterns of music listened to by a driver while performing driving functions and traveling between destinations may also be analyzed. For example, the "energy" of the music may be determined. Identified patterns in choice of music associated with driving habits may provide context and provide an indicator that may be used in future predictions and suggestions of musical mood. While the techniques described herein relate to music, additional embodiments dealing with other media contexts (e.g., audio, video, or both) are envisioned. For example, podcasts, sports broadcasts, audiobooks, or any suitable combination thereof may be utilized.

In various embodiments, the energy of a music selection or other audio may be plotted by using descriptions of the audio's valence and arousal. A similar analysis may be used to determine a driver's state. In example embodiments, a driver may be determined to be agitated, and a selection of music may be made which is designed to lessen the driver's agitation. The driver's response to the music selection may be monitored and future selections modified in response.

In some example embodiments, the current traffic environment is determined, for example, based on traffic data or by analyzing the driver's patterns (e.g., stop-and-go driving style or frequent lane shifts). This may provide data usable to estimate a driving challenge level, which may provide one axis of a plotting of the driver's state. Another data source may be a perceived skill level (e.g., within Mihaly Csikszentmihalyi's model of flow or another model of perceived skill level). In some example embodiments, if a driver indicates (e.g., as determined via sensor data) that she lacks confidence (e.g., the driver feels challenged, lacks the requisite skill, or both) and the current traffic situation is difficult (e.g., dense), then the driver may begin to drive more erratically or dangerously. Similarly, in some example embodiments, a driver may feel overconfident and feel that the challenge level is low (e.g., a long empty stretch of road), and this may lead to the driver becoming less aware of his surroundings.

According to various embodiments, appropriate selection of music may be used to alter a driver's current emotional state, physical state, or both, and, as a result, increase the driver's safety and awareness level. While other approaches may simply use high or low energy music to change a driver's awareness and emotional state, the techniques discussed herein provide a much more fine-grained approach to the selection of appropriate music to set an appropriate mood. For example, people's reactions to music are dependent on their consumption of music as well as their current state of mind. As an example, while heavy metal music may be commonly considered "high energy," and conventional wisdom would indicate that listening to it would energize the listener, people who often listen to heavy metal may not have the expected reaction. Similarly, a selection of smooth jazz may have "low energy," but to a heavy metal listener, it may not provide a desired soothing effect. Rather, it may contribute to an enhanced level of aggression or agitation. Music that is identified as being of a certain energy level or a certain genre may not be the correct choice to move a driver's emotional state or physical state (e.g., from sleepy to aware).

The techniques described herein operate to select music that is appropriate for shifting a driver from one physical or emotional state to another physical or emotional state (e.g., state-shifting the driver), and the music selections are monitored and adjusted in real-time to provide the desired effect. In some example embodiments, a music profile for a driver is used to provide information regarding what the driver likes or does not like (e.g., genres, such as heavy metal or smooth jazz, artists, or energy level). In some example embodiments, it may be assumed that generally popular music is known to a driver and may have a particular effect. However, familiarity may cause both positive effects (e.g., "that song I used to love years ago") or negative effects (e.g., "that song I'm tired of hearing"), and approaches described herein provide for personalization. For example, a classic rock fan may be assumed to be aware of Led Zeppelin, so a selection of Led Zeppelin songs may not have an intended effect. Rather, familiar music may serve to bore or otherwise disengage the driver. However, a selection of obscure music that matches the driver's music profile may have the effect of energizing or engaging the driver, which may raise the driver's energy level. Approaches described herein regarding "familiarity" take into account actual reactions to the music and many other variables (e.g., whether there are other people in the car). Additionally, familiarity may be inferred from music profiles in some embodiments. Similarly, fast tempo music in a familiar genre or other space may energize a listener, but tempo alone may not have a desired effect. A fan of heavy metal may relax more easily when hearing slow tempo yet high-energy songs. Therefore, to energize a driver, it may be beneficial to select more than just high-tempo songs and an obscure selection of high tempo in an appropriate genre or type may be beneficial. Approaches described herein regarding "tempo" take into account the actual reactions of the driver to the music and many other variables (e.g., whether there are other people in the car).

In some example embodiments, the recommendation approaches described herein learn over time and refine the automated selection of music by monitoring and analyzing measurable responses from a listener. For example, when the sensors provide data indicating that a particular audio selection is having a desired effect (e.g., making a driver more alert or more calm), the system may record data to that effect. Similarly, user interactions may provide data used in future music selections (e.g., a user skipping a song or turning the volume up or down provides valuable data regarding the appropriateness of the song choice).

In some example embodiments, the approaches described herein provide a contextual playlist that may be used based on a user's state and an occasion, such as traveling to a particular destination or attending a sporting event. Sensors (e.g., automobile sensors and personal sensors such as heart rate monitors) may detect a user's state and an occasion may be provided by a user or automatically determined based on other data (e.g., GPS data and calendar data). Examples of using occasion data (e.g., accessed from within calendar data) include playing Christmas music on the way to a Christmas party, playing sports-themed music on the way to a sporting event, and playing the music of a relevant artist or relevant genre on the way to a concert.

Figure 16:
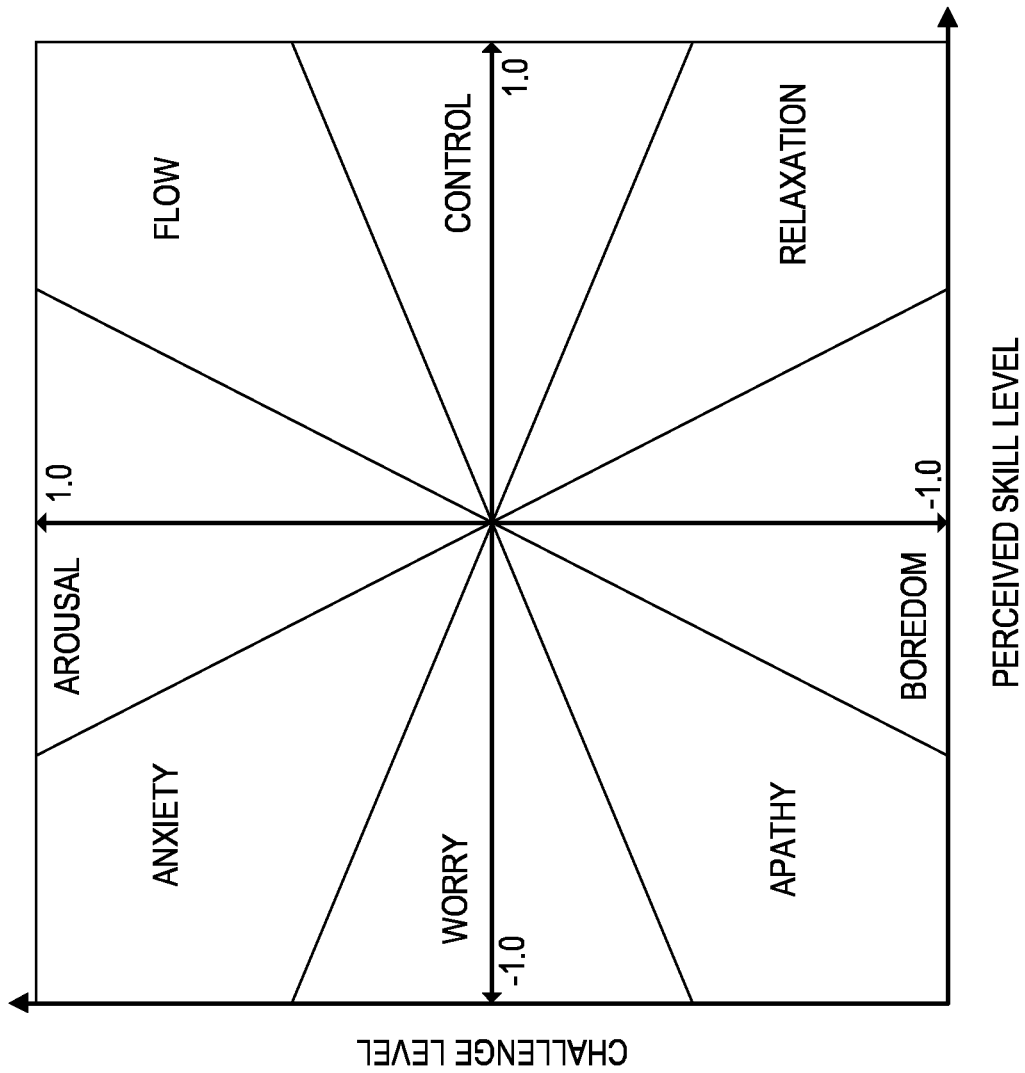

Example embodiments may be described with respect to a graph of flow state provided in FIGS. 15 and 16. A driver may begin with a particular state, such as that graphed on the axes of "challenge level" and "perceived skill level", and during a trip (e.g., commute to work), each of these representations may be altered as indicated in the figures, with the driver ending up in a particular state. Similarly, a driver may experience a change in state during a return drive home from work.

An energy contour (such as that in FIG. 18) may be utilized to visualize and analyze music. For example, it may provide a mapping of moods into one dimension, for example by using multiple low-level attributes from music to calculate energy. These attributes may comprise tempo, dynamic range, percussive elements, width of beats, frequency spectrum, or any suitable combination thereof. Peaks in the energy contour may be used to populate and analyze an energy grid, as well as being part of a play count analysis, playlist analysis, or playlist generation analysis.

According to various example embodiments, the emotional state data described herein may be represented in any number of ways (e.g., in a single array or other structure). In some example embodiments, additional passengers in a vehicle may also have an associated profile (e.g., for mood, taste, music, audio, or any suitable combination thereof) that is taken into account. Analysis may be performed to select music that is appropriate for all parties in the vehicle, and such an analysis may include determination of much more than an intersection of the attendant profiles. According to various example embodiments, sensory data and music attributes are utilized to affect a listener, for example, by changing her from one physical, mental, or emotional state to another physical, mental, or emotional state by using observed data in a particular context and choosing music according to one or more profiles associated with the listener, which is intended to create or modify the listener's state.

Music associated with a user and categorized by various criteria (e.g., energy, popularity, genre, or attributes) into a music profile may be compared with data associated with the user's current state, the user's current environment, or both, in a process to select music corresponding to the music profile, resulting in a change in the user's state. Data may be received, interpreted and analyzed to understand the states and refine music selection. The example methods and systems described herein may be utilized with any type of media file (e.g., audio file, video file, or any suitable combination thereof).

Figure 10:
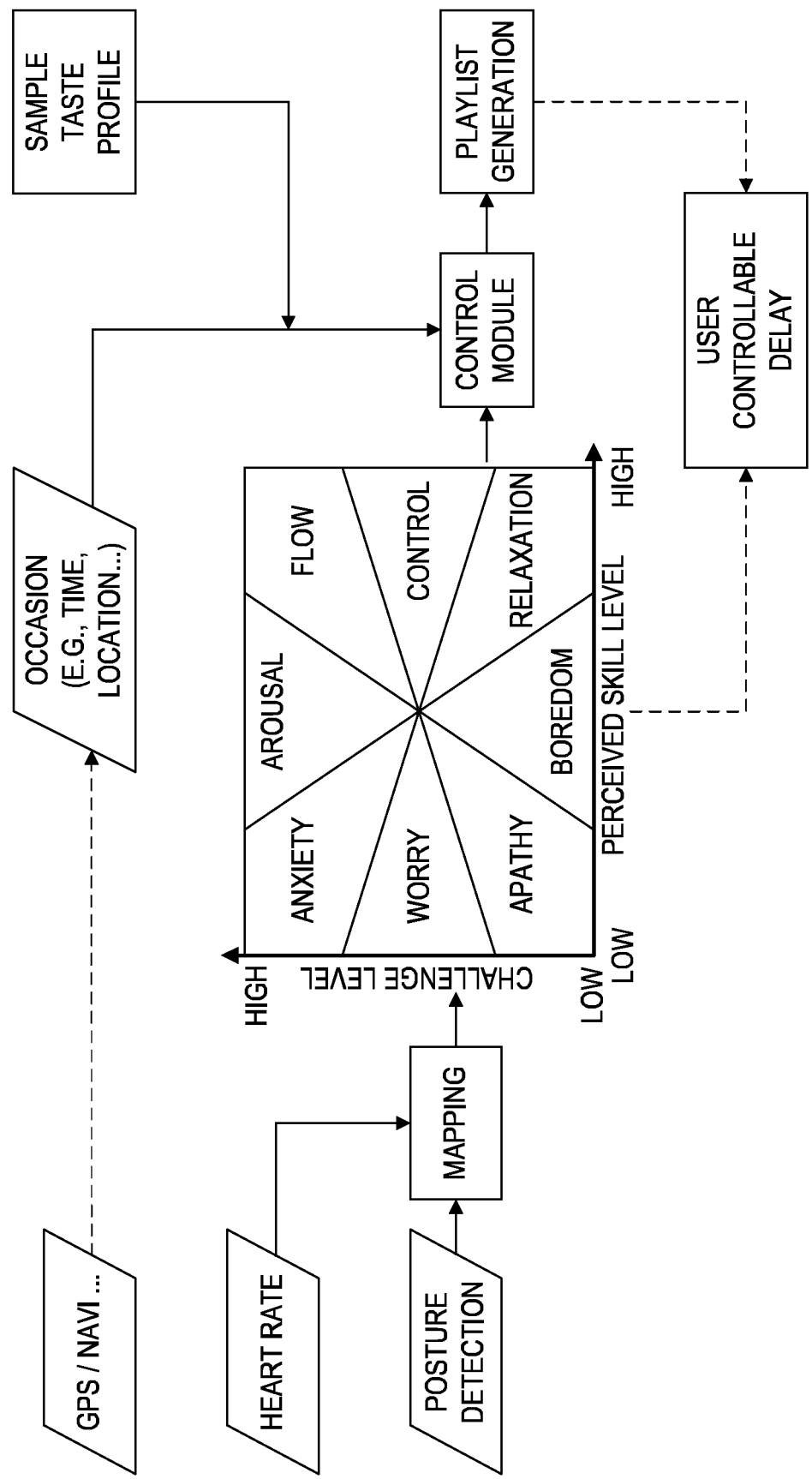
FIG. 10 illustrates an example environment for selecting music mood, in accordance with various example embodiments.

FIG. 10 illustrates an example environment for selecting music mood, in accordance with various example embodiments. Various sensor data describing a user (e.g., heart rate or detected posture data) may be mapped into a grid such as that described below with regard to FIGS. 15 and 16. This information, in addition to other information, such as location data (e.g., GPS data, destination data, or navigation data) and occasion data (e.g., time data or calendar data) may be used along with the user state data and information describing a user's music taste to generate a playlist.

Figure 11:
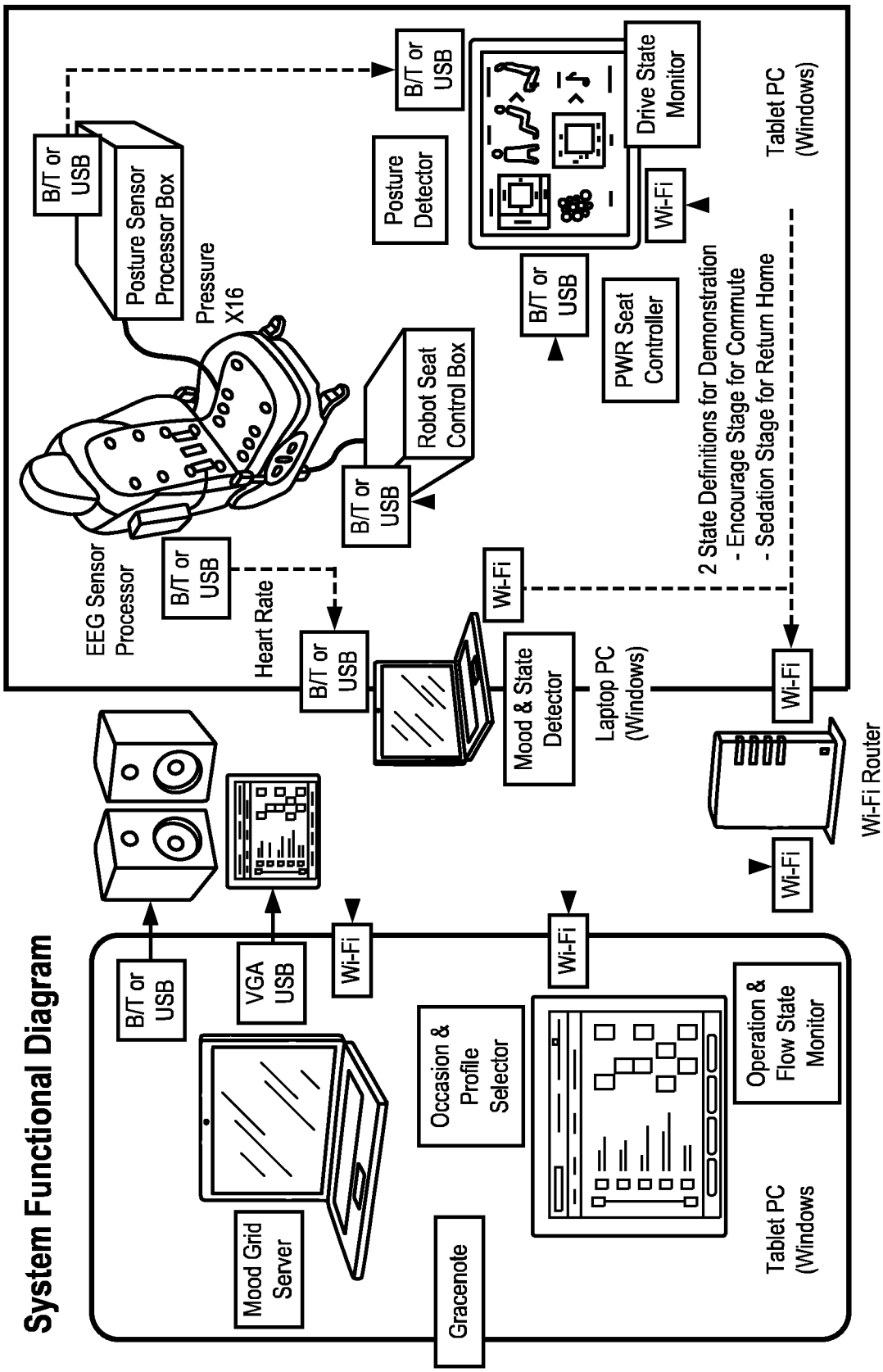
FIG. 11 illustrates an example system for selecting music mood, in accordance with various example embodiments.

FIG. 11 illustrates an example system for selecting music mood, in accordance with various example embodiments. Various sensor data may be received, for example from sensors in an automobile (e.g., in the driver's seat) and provided to a driver state monitor that may communicate with an operation and flow state monitor and music profile. All or some of the components may store data locally or access data via a network.

FIG. 12 illustrates an example approach for selecting music mood, in accordance with various example embodiments. Data about a user (e.g., heart rate and seat position data) may be mapped onto a two-dimensional (2D) flow model or other model. Occasion data may be retrieved and analyzed (e.g., with GPS data, navigation data, or both). The flow or other model is analyzed in conjunction with a user's music profile and the occasion data to create a playlist that will guide a user into a particular state (e.g., on the 2D flow model). This particular state and the transition may be monitored and changes to the playlist generated on the fly. The playlist may be generated with respect to various musical attributes in addition to the user's taste or preferences, with the user able to control a rate of response by which the playlist may be varied.

FIG. 13 illustrates an example approach for selecting music mood, in accordance with various example embodiments. Contextual playlist generation (e.g., contextual playlisting in a vehicle or on a portable computing device) may be based on a user's state and occasion, in addition to other data. The state may be detected (e.g., by sensors or by user interaction) while the user selects an occasion, or the state, the occasion, or both may be determined by analyzing various data such as GPS data, navigation data, calendar data, contact data, or any suitable combination thereof.

FIG. 14 illustrates an example approach for selecting music mood in accordance with various example embodiments. A user may have two different contexts in this example: driving to work and driving home from work. Each context may utilize different music to adjust the user's state based on the context. For example, while going to work, a user may desire to be encouraged and alert. While coming home, the user may desire to be relaxed and satisfied. In some example embodiments, using the training approaches described herein, a playlist for a trip may be adjusted from a baseline playlist based on contextual factors (e.g., traffic data, which may be determined by average speed and braking data, weather data, occasion data, holiday data, or any suitable combination thereof).

FIGS. 15 and 16 illustrate an example approach for selecting music mood, in accordance with various example embodiments. Any number of axes (e.g., on a flow grid or other emotional flow diagram) describing any number of states may be utilized.

FIG. 17 illustrates an example approach for determining and describing a user state, in accordance with various example embodiments. In some example embodiments, a particular desired state is determined, the user's current state is determined, and a playlist of music is selected in an attempt to move the user from the current state to the desired state. The music may be selected based on various criteria (e.g., the energy or subjective arousal of the music). This may be determined by analyzing the valence and arousal characteristics of various music.

Figure 18:
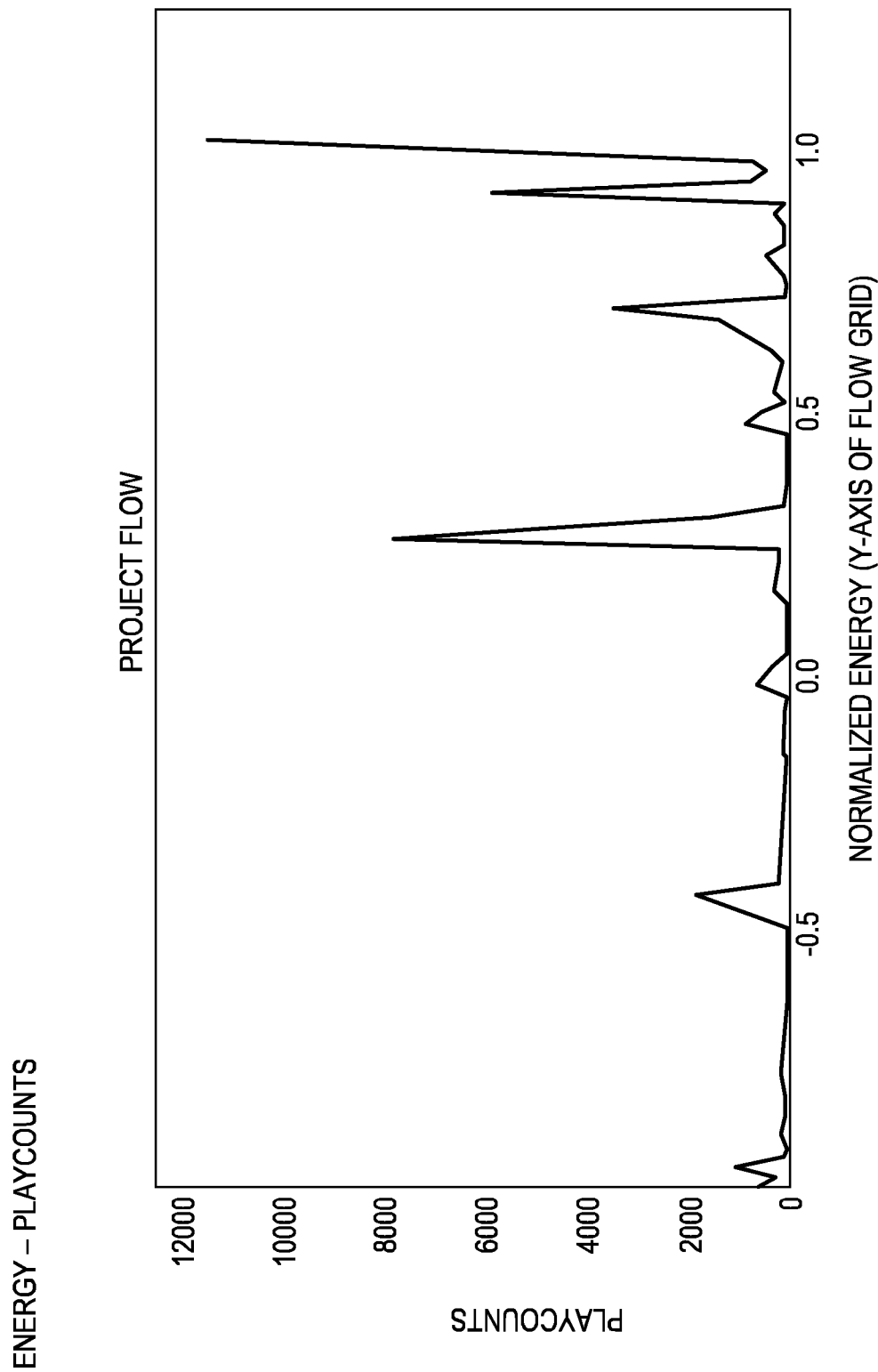

FIG. 18 illustrates an example approach for selecting music mood, in accordance with various example embodiments. For example, the figure describes the "energy profile" of a user and includes a count of the number of songs in the user's history with particular energy values.

Figure 19:
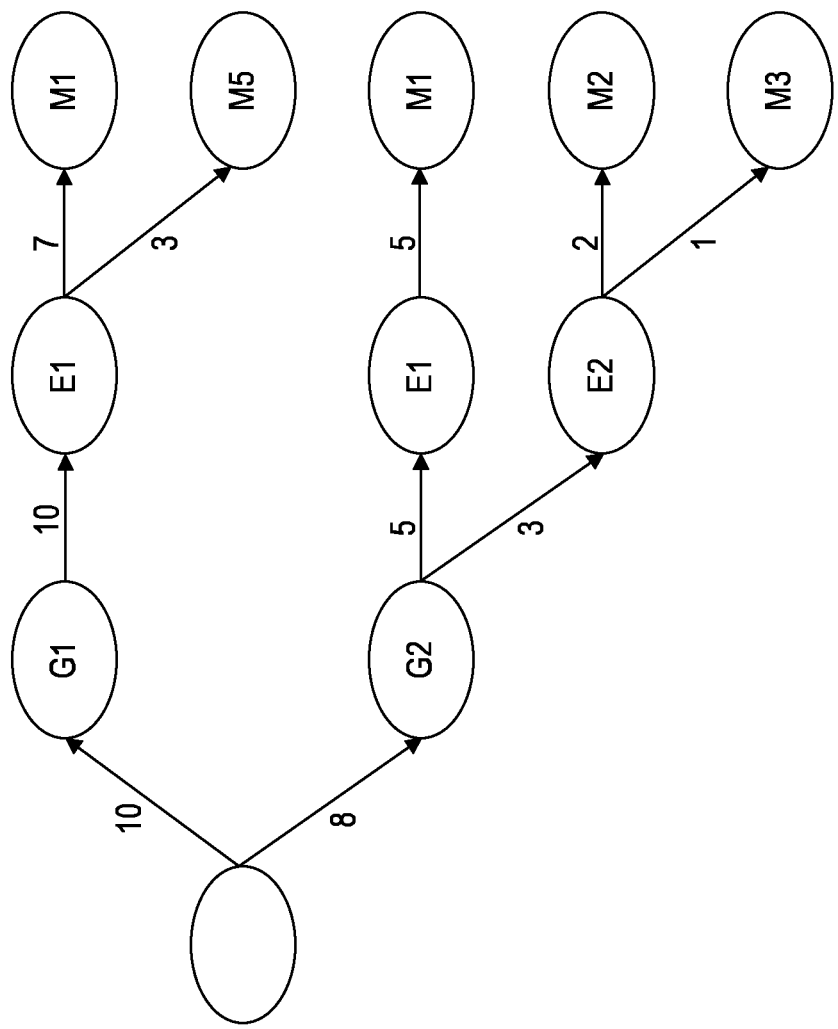

FIG. 19 illustrates an example approach for selecting music mood, in accordance with various example embodiments. In some example embodiments, the energy profile of the user is determined by using the user's taste profile, which may cluster attributes (e.g., mood) along with weights (e.g., the number of tracks in the profile with that set of attributes). Going through each cluster, one may get a count of every mood and the play counts for that mood in the history. One then maps mood to an energy value, and then normalizes the energy to a convenient mathematical range (e.g., -1,1). The output of this process is visualized in the energy profile (e.g., the energy profile of FIG. 18).

FIG. 20 illustrates an example approach for selecting music mood, in accordance with various example embodiments. In some example embodiments, the target energy level can be selected, and a system may select it automatically based on the intended destination of the driver (e.g., if the trip is driving from home to work on a weekday morning, the target energy level is set to a high energy level). The current energy of the driver, as measured from car sensors, is also an input. The system then selects a song with a mood to achieve the target energy. For example, the system may internally pick an energy level, map energy back to mood, and use that mood as a seed for generating a playlist. The system may compensate for the current energy level, if the current energy level is not near the target. For example, if the user is drifting off to sleep, but the target is high energy, the system will play increasingly higher energy music. The system also frequently picks familiar moods (e.g., peaks in the energy profile), to pick songs in the collection that the user is familiar with. There is also some randomness built into the system, so that the system explores moods close to the target mood (e.g., in terms of energy) and does not always pick the same mood to complement the same target mood and current energy inputs.

Figure 21:
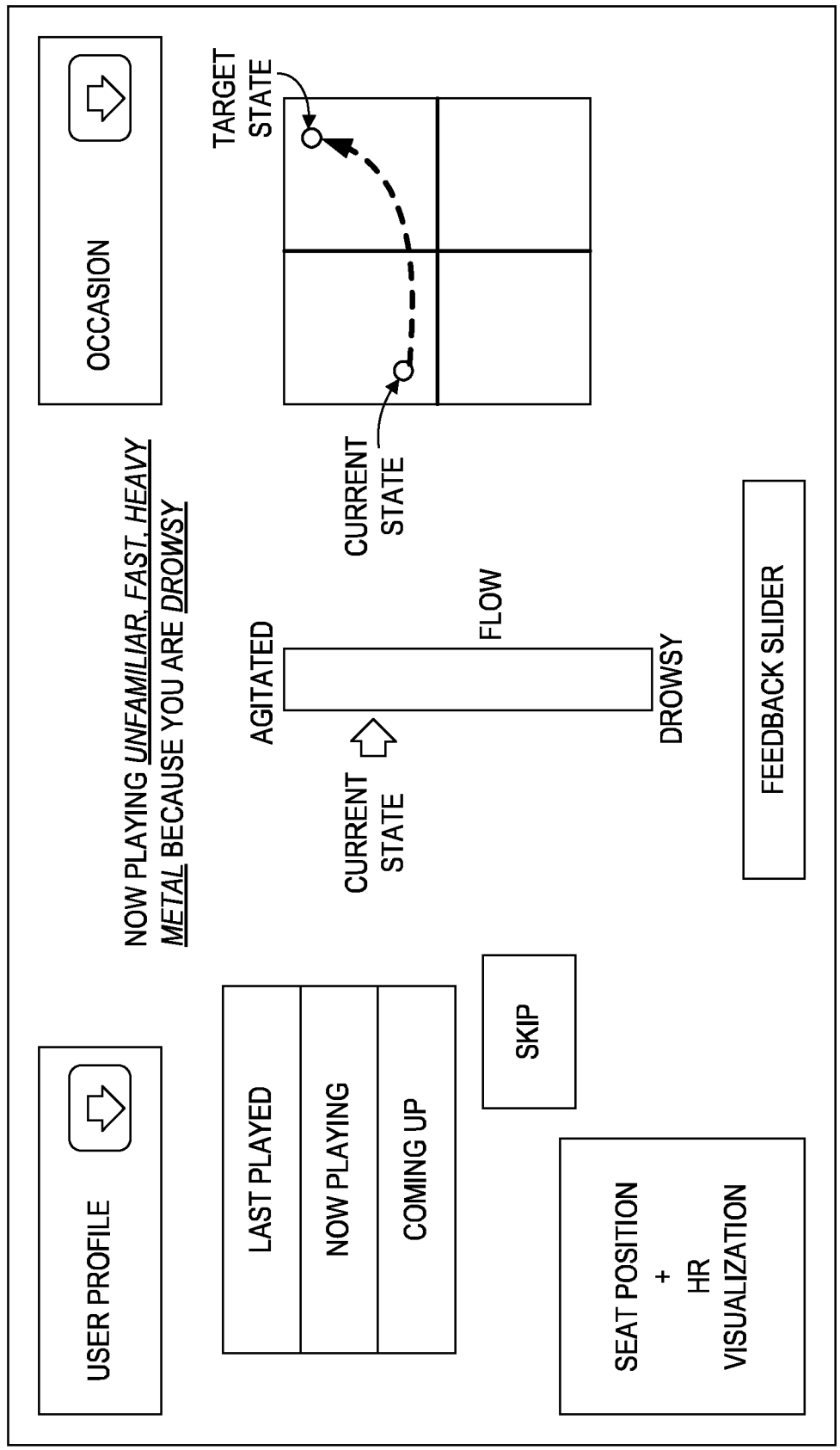
FIGS. 21-23 illustrate example user interfaces for selecting music mood, in accordance with various example embodiments.
Figure 22:
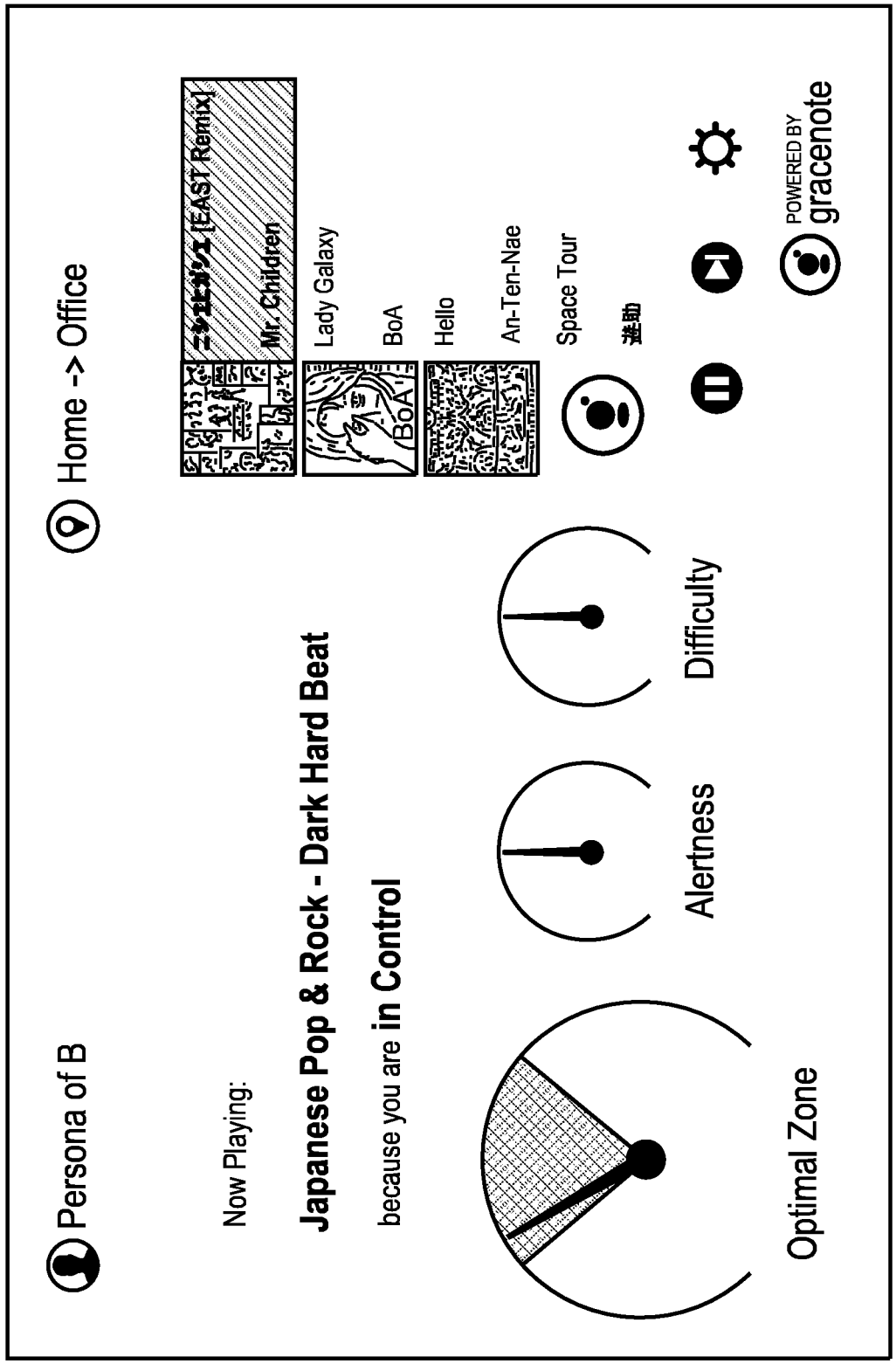
Figure 23:
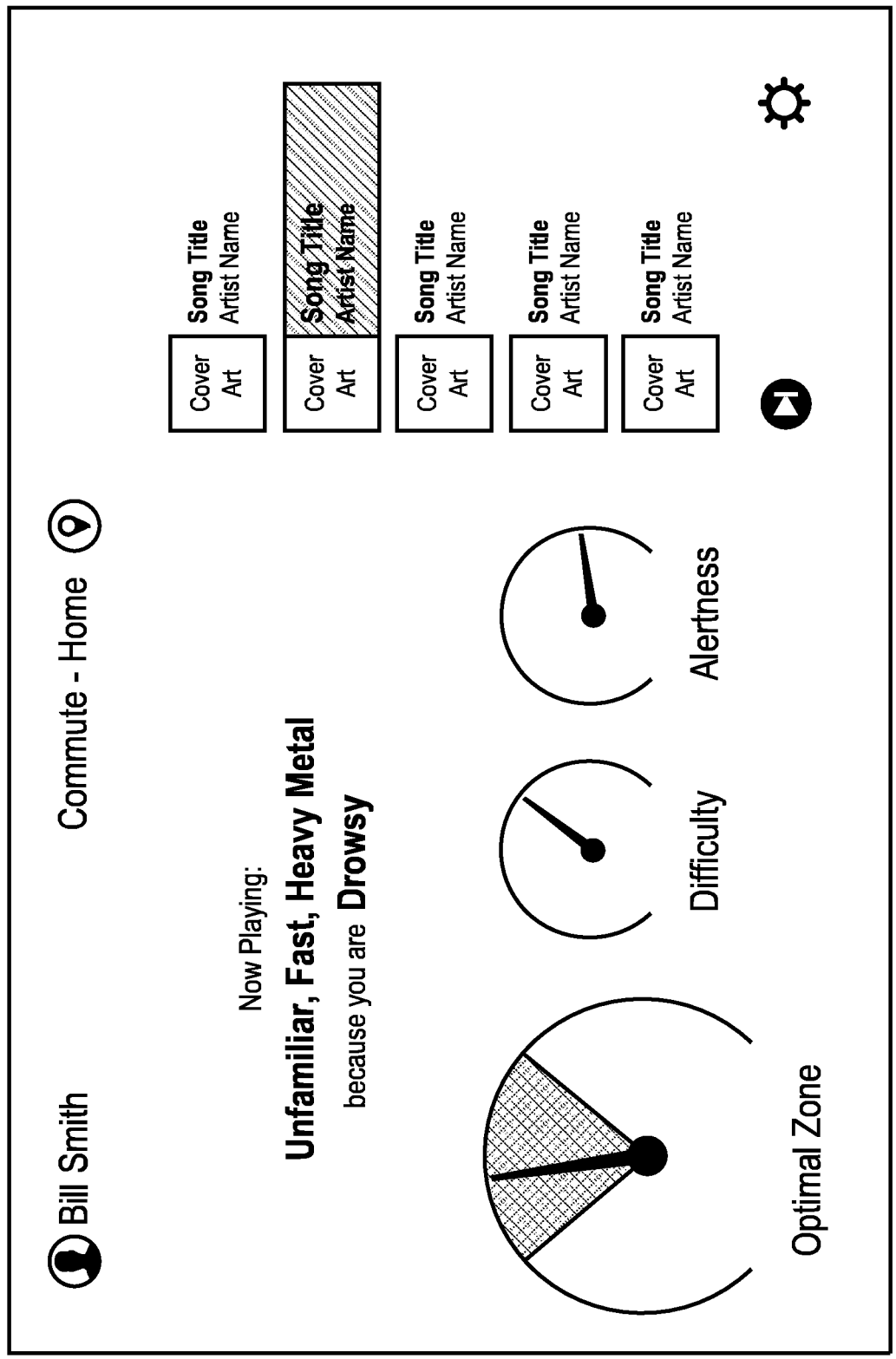

FIGS. 21-23 illustrate example user interfaces for selecting music mood, in accordance with various example embodiments. In some example embodiments, a user has the ability to select a taste profile (e.g., by identifying himself) and a commute or occasion (e.g., driving from home to work, or driving from work to home). This would create the energy profile (e.g., from the taste profile) and select a target energy (e.g., based on the commute or occasion). The large dial shown in FIGS. 22 and 23 represents how far the user is from the target mood. For example, if the dial swings to the left of center, the user has less energy than the target mood. The smaller two dials correspond to the axes of a flow grid diagram interface (e.g., broken out for individual display) and represent the current perceived skill and challenge levels measured by the sensors. The user also has access to music controls, and such music controls may enable the user to skip to the next song (e.g., visualized with cover art) or enable the user to stop the music. The playlist is periodically refreshed at a rate that may be controlled by the user in the settings pane (e.g., the gear icon at the bottom right of the FIGS. 22 and 23). This may be used to remove rapid changes of the playlist.

According to various example embodiments, one or more of the methodologies described herein may facilitate selection of one or more media files for playback to one or more users (e.g., users 132 and 152), based on detection of an activity in which a user (e.g., user 132) is engaged and based on a target mood (e.g., a target physical, mental, or emotional state, as represented by a target arousal score, a target valence score, a target dominance score, or any suitable combination thereof) that corresponds to the detected activity. Moreover, one or more of the methodologies described herein may facilitate such selection of one or more media files further based on detection of a current mood (e.g., a current physical, mental, or emotional state, as evidenced by a current arousal score, a current valence score, a current dominance store, or any suitable combination thereof) of at least the user (e.g., user 132 alone, the users 132 and 152 together, or all persons within the vehicle 135). Hence, one or more of the methodologies described herein may facilitate machine-led mood change with respect to musical mood, as well as machine-led mood change with respect to the physical, mental, or emotional state of one or more human beings.

When these effects are considered in aggregate, one or more of the methodologies described herein may obviate a need for certain efforts or resources that otherwise would be involved in machine-led mood change in terms of musical moods, human physical states, human mental states, human emotional states, or any suitable combination thereof. Efforts expended by a user (e.g., user 132, user 152, a human audio therapist, or a human disc jockey) in leading, inspiring, initiating, or otherwise facilitating such mood change may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 24:
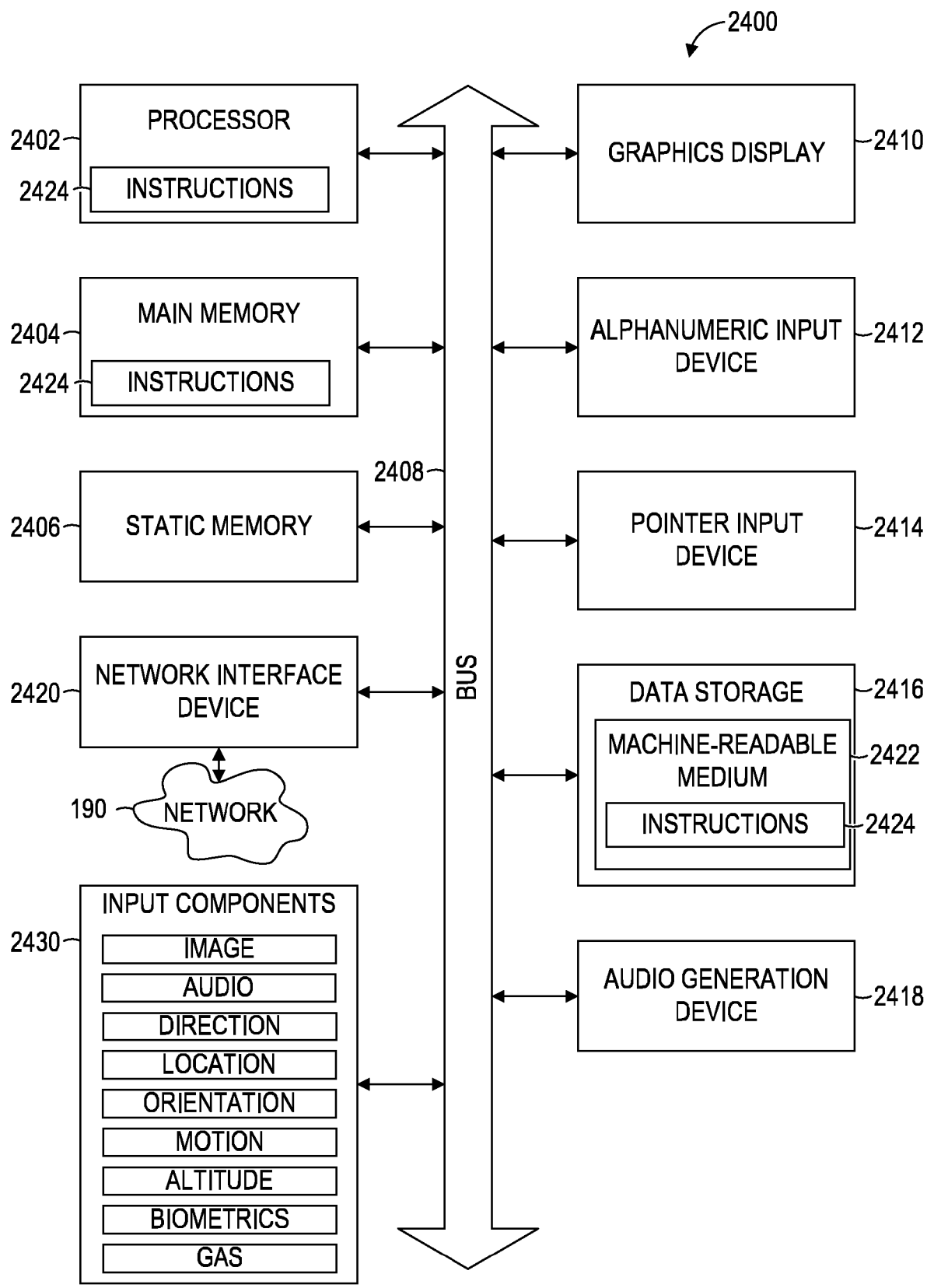
FIG. 24 is a block diagram illustrating components of a machine, according to some example embodiments, able to read instructions from a machine-readable medium and perform any one or more of the methodologies discussed herein.

FIG. 24 is a block diagram illustrating components of a machine 2400, according to some example embodiments, able to read instructions 2424 from a machine-readable medium 2422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 24 shows the machine 2400 in the example form of a computer system (e.g., a computer) within which the instructions 2424 (e.g., software, a program, an application, an applet, an app, or other executable code) for causing the machine 2400 to perform any one or more of the methodologies discussed herein may be executed, in whole or in part.

In alternative embodiments, the machine 2400 operates as a standalone device or may be communicatively coupled (e.g., networked) to other machines. In a networked deployment, the machine 2400 may operate in the capacity of a server machine or a client machine in a server-client network environment, or as a peer machine in a distributed (e.g., peer-to-peer) network environment. The machine 2400 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 2424, sequentially or otherwise, that specify actions to be taken by that machine. Further, while only a single machine is illustrated, the term "machine" shall also be taken to include any collection of machines that individually or jointly execute the instructions 2424 to perform all or part of any one or more of the methodologies discussed herein.

The machine 2400 includes a processor 2402 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 2404, and a static memory 2406, which are configured to communicate with each other via a bus 2408. The processor 2402 contains solid-state digital microcircuits (e.g., electronic, optical, or both) that are configurable, temporarily or permanently, by some or all of the instructions 2424 such that the processor 2402 is configurable to perform any one or more of the methodologies described herein, in whole or in part. For example, a set of one or more microcircuits of the processor 2402 may be configurable to execute one or more modules (e.g., software modules) described herein. In some example embodiments, the processor 2402 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 2400 with at least the processor 2402, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 2400 may further include a graphics display 2410 (e.g., a plasma display panel (PDP), a light emitting diode (LED) display, a liquid crystal display (LCD), a projector, a cathode ray tube (CRT), or any other display capable of displaying graphics or video). The machine 2400 may also include an alphanumeric input device 2412 (e.g., a keyboard or keypad), a pointer input device 2414 (e.g., a mouse, a touchpad, a touchscreen, a trackball, a joystick, a stylus, a motion sensor, an eye tracking device, a data glove, or other pointing instrument), a data storage 2416, an audio generation device 2418 (e.g., a sound card, an amplifier, a speaker, a headphone jack, or any suitable combination thereof), and a network interface device 2420.

The data storage 2416 (e.g., a data storage device) includes the machine-readable medium 2422 (e.g., a tangible and non-transitory machine-readable storage medium) on which are stored the instructions 2424 embodying any one or more of the methodologies or functions described herein. The instructions 2424 may also reside, completely or at least partially, within the main memory 2404, within the static memory 2406, within the processor 2402 (e.g., within the processor's cache memory), or any suitable combination thereof, before or during execution thereof by the machine 2400. Accordingly, the main memory 2404, the static memory 2406, and the processor 2402 may be considered machine-readable media (e.g., tangible and non-transitory machine-readable media). The instructions 2424 may be transmitted or received over the network 190 via the network interface device 2420. For example, the network interface device 2420 may communicate the instructions 2424 using any one or more transfer protocols (e.g., hypertext transfer protocol (HTTP)).

In some example embodiments, the machine 2400 may be a portable computing device (e.g., a vehicle device, a smart phone, a tablet computer, or a wearable device), and may have one or more additional input components 2430 (e.g., sensors or gauges). Examples of such input components 2430 (e.g., sensors) include an image input component (e.g., one or more cameras), an audio input component (e.g., one or more microphones), a direction input component (e.g., a compass), a location input component (e.g., a global positioning system (GPS) receiver), a velocity input component (e.g., speedometer), an orientation component (e.g., a gyroscope), a motion detection component (e.g., one or more accelerometers), an altitude detection component (e.g., an altimeter), a biometric input component (e.g., a force transducer, a pressure transducer, a blink detector, an eye movement tracker, a blood glucose level detector, a heart rate detector, a blood pressure detector, a galvanic skin response meter, an electroencephalogram generator, or an electrocardiogram generator), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 2424 for execution by the machine 2400, such that the instructions 2424, when executed by one or more processors of the machine 2400 (e.g., processor 2402), cause the machine 2400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 2424 for execution by the machine 2400 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 2424).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors of a machine, play counts that quantify playbacks of media files played for a user, the play counts being accessed from a playback history database of the user;
accessing, by one or more processors of the machine, arousal scores of the media files played for the user, the arousal scores indicating energy levels humanly perceivable in the playbacks of the media files;
determining, by one or more processors of the machine, a distribution of the play counts over the arousal scores, the distribution indicating relative maximum play counts that each correspond to a different arousal score among the arousal scores;
selecting, by one or more processors of the machine, a target arousal score for the user based on contextual data that describes an activity in which the user is engaged; and
selecting, by one or more processors of the machine, a media file for playback to the user, the selecting of the media file being based on the target arousal score and based on an arousal score that corresponds to a relative maximum play count included in the distribution of the play counts over the arousal scores.

A second embodiment provides a method according to the first embodiment, further comprising:
determining, by one or more processors of the machine, a current arousal score of the user based on a biometric measurement of the user; and wherein
the selecting of the media file is further based on the current arousal score of the user.

A third embodiment provides a method according to the second embodiment, wherein:
the determining of the current arousal score includes detecting the biometric measurement of the user via a biometric sensor.

A fourth embodiment provides a method according to the second embodiment or the third embodiment, wherein:
the biometric measurement is selected from a group consisting of:
a force applied by the user to a portion of a car seat,
a frequency at which the force applied by the user to the portion of the car seat fluctuates,
a duration of a blink of an eye of the user,
a frequency at which the eye of the user blinks, a frequency at which the eye of the user moves,
a blood glucose level of the user,
a heart rate of the user,
a frequency at which the heart rate of the user fluctuates,
a galvanic skin response measurement of the user,
a force applied by the user to a portion of a steering wheel,
a frequency at which the force applied by the user to the portion of the steering wheel fluctuates,
a frequency at which a brake pedal is pressed by the user,
a speed of a vehicle being operated by the user,
a frequency at which the vehicle changes direction,
an electroencephalogram of the user, and
an electrocardiogram of the user.

A fifth embodiment provides a method according to any of the second through fourth embodiments, wherein:
the biometric measurement of the user indicates that the user is drowsy;
the contextual data indicates that the activity in which the user is engaged is driving a vehicle;
the selected target arousal score and the arousal score that corresponds to the relative maximum play count are higher than the current arousal score; and
the selecting of the media file for playback to the user is based on the arousal score that corresponds to the relative maximum play count being higher than the current arousal score.

A sixth embodiment provides a method according to any of the second through fourth embodiments, wherein:
the biometric measurement of the user indicates that the user is agitated;
the contextual data indicates that the activity in which the user is engaged is driving a vehicle;
the selected target arousal score and the arousal score that corresponds to the relative maximum play count are lower than the current arousal score; and
the selecting of the media file for playback to the user is based on the arousal score that corresponds to the relative maximum play count being lower than the current arousal score.

A seventh embodiment provides a method according to any of the first through sixth embodiments, wherein:
the selecting of the media file includes determining that a candidate media file among the media files played for the user has a candidate arousal score within a threshold tolerance of the arousal score that corresponds to the relative maximum play count; and
the selecting of the media file selects the candidate media file based on the candidate arousal score being within the threshold tolerance of the arousal score that corresponds to the relative maximum play count.

An eighth embodiment provides a method according to any of the first through sixth embodiments, wherein:
the selecting of the media file includes determining that a candidate media file in a group of media files from which the media files played for the user are absent has a candidate arousal score within a threshold tolerance of the arousal score that corresponds to the relative maximum play count; and
the selecting of the media file selects the candidate media file from the group of media files from which the media files played for the user are absent.

A ninth embodiment provides a method according to any of the first through sixth embodiments, wherein:
the selecting of the media file includes determining that a candidate media file among the media files played for the user has a candidate arousal score beyond a threshold value from the arousal score that corresponds to the relative maximum play count; and
the selecting of the media file selects the candidate media file based on the candidate arousal score being beyond the threshold value from the arousal score that corresponds to the relative maximum play count.

A tenth embodiment provides a method according to any of the first through sixth embodiments, wherein:
the selecting of the media file includes determining that a candidate media file in a group of media files from which the media files played for the user are absent has a candidate arousal score beyond a threshold value from the arousal score that corresponds to the relative maximum play count; and
the selecting of the media file selects the candidate media file from the group of media files from which the media files played for the user are absent.

An eleventh embodiment provides a method according to any of the first through tenth embodiments, wherein:
the selecting of the target arousal score includes:
detecting the contextual data via a sensor; and
accessing a context database that maps the contextual data to the target arousal score.

A twelfth embodiment provides a method according to any of the first through eleventh embodiments, wherein:
the selecting of the media file includes selecting the arousal score that corresponds to the relative maximum play count based on the arousal score that corresponds the relative maximum play count being between a current arousal score (e.g., a current arousal score determined according to the second embodiment) and the target arousal score.

A thirteenth embodiment provides a method according to the twelfth embodiment, wherein:
the selecting of the arousal score that corresponds to the relative maximum play count is based on a calculated difference between the target arousal score and the current arousal score.

A fourteenth embodiment provides a method according to the twelfth embodiment, wherein:
the selecting of the arousal score that corresponds to the relative maximum play count includes:
calculating differences between the target arousal score and each of the arousal scores that correspond to the relative maximum play counts in the distribution; and
determining a smallest difference among the differences between the target arousal score and each of the arousal scores that correspond to the relative maximum play counts.

A fifteenth embodiment provides a method according to any of the first through fourteenth embodiments, wherein:
the selecting of the media file includes:
determining that the relative maximum play count transgresses a threshold play count; and
selecting the arousal score that corresponds to the relative maximum play count based on the relative maximum play count transgressing the threshold play count.

A sixteenth embodiment provides a method according to any of the first through fifteenth embodiments, further comprising:
causing the selected media file to be played to the user.

A seventeenth embodiment provides a machine-readable medium (e.g., a non-transitory machine-readable storage medium) comprising instructions that, when executed by one or more processors of a machine, cause the machine to perform operations comprising:

accessing play counts that quantify playbacks of media files played for a user, the play counts being accessed from a playback history database of the user;

accessing arousal scores of the media files played for the user, the arousal scores indicating energy levels humanly perceivable in the playbacks of the media files;

determining a distribution of the play counts over the arousal scores, the distribution indicating relative maximum play counts that each correspond to a different arousal score among the arousal scores;

selecting a target arousal score for the user based on contextual data that describes an activity in which the user is engaged; and selecting a media file for playback to the user, the selecting of the media file being based on the target arousal score and based on an arousal score that corresponds to a relative maximum play count included in the distribution of the play counts over the arousal scores.

An eighteenth embodiment provides a machine-readable medium according to the seventeenth embodiment, wherein: the arousal scores quantify energy levels along an arousal-nonarousal scale within a Pleasure, Arousal, and Dominance (PAD) model of emotional states.

A nineteenth embodiment provides a system comprising: processors; and a memory storing instructions that, when executed by at least one processor among the processors, cause the system to perform operations comprising:

accessing play counts that quantify playbacks of media files played for a user, the play counts being accessed from a playback history database of the user;

accessing arousal scores of the media files played for the user, the arousal scores indicating energy levels humanly perceivable in the playbacks of the media files;

determining a distribution of the play counts over the arousal scores, the distribution indicating relative maximum play counts that each correspond to a different arousal score among the arousal scores;

selecting a target arousal score for the user based on contextual data that describes an activity in which the user is engaged; and selecting a media file for playback to the user, the selecting of the media file being based on the target arousal score and based on an arousal score that corresponds to a relative maximum play count included in the distribution of the play counts over the arousal scores.

A twentieth embodiment provides a system according to the nineteenth embodiment, wherein:

the play counts quantify recognitions of playbacks of media files that are played for the user and recognized by an audio identifier, the playback history database of the user including records of the recognitions of the playbacks of the media files.

A twenty-first embodiment provides a method comprising:

accessing, by one or more processors of a device, contextual data that describes an activity in which a user of the device is engaged;

selecting, by one or more processors of the device, a target arousal score for the user, the target arousal score being selected from a database that correlates activities to target arousal scores, the target arousal score being selected based on the contextual data that describes the activity in which the user is engaged; and selecting, by one or more processors of the device, a media file for playback to the user, the selecting of the media file being based on the target arousal score.

A twenty-second embodiment provides a carrier medium carrying machine-readable instructions for controlling a machine to carry out the operations of any one of the previously described embodiments.

What is claimed is:

1. A system comprising:
a sensor in a vehicle to generate sensor data indicative of an interaction between a user and the vehicle, the interaction defining a characteristic of a user input relative to a component of the vehicle; and
a media selector machine to:
detect a driving condition based on the sensor data;
select a target user state score for the user based on the driving condition and a maximum peak relative to peaks in a distribution, the distribution including a mapping of media play counts to previous corresponding state scores; and
select, as a selected audio media file, one of a plurality of audio media files to present to the user based on the target user state score.

2. The system of claim 1, wherein the media selector machine is to:
access user state scores of the audio media files; and
select the selected audio media file based on the user state score of the selected audio media file and the target user state score.

3. The system of claim 1, wherein the sensor data is indicative of a fluctuation in a force applied on a steering wheel, the media selector machine to detect the driving condition based on the fluctuation in the force applied on the steering wheel.

4. The system of claim 1, wherein the sensor data is indicative of use of windshield wipers, the media selector machine to detect the driving condition based on the use of the windshield wipers.

5. The system of claim 1, wherein the sensor data is indicative of a brake pedal depression frequency, the media selector machine to detect the driving condition based on the brake pedal depression frequency.

6. The system of claim 1, wherein the sensor data is indicative of a vehicle direction change frequency, the media selector machine to detect the driving condition based on the vehicle direction change frequency.

7. The system of claim 1, wherein the sensor data is indicative of use of vehicle climate control, the media selector machine to detect the driving condition based on the user of the vehicle climate control.

8. The system of claim 1, wherein the media selector machine is to output the selected audio media file for presentation to the user.

9. A system comprising:
a sensor in a vehicle;
a media selector machine to:
detect a driving condition based on data generated by the sensor; and
select, as a selected audio media file, one of a plurality of audio media files to present to a driver based on the driving condition; and
a play count accessor to access play counts that quantify playback of one or more of the audio media files, wherein the media selector machine is to:
compare play counts of the audio media files to a threshold number of playbacks;
categorize respective ones of the audio media files as familiar media files when the corresponding play counts satisfy the threshold number of playbacks;

categorize respective ones of the audio media files as unfamiliar media files when the corresponding play counts do not satisfy the threshold number of playbacks; and select the selected audio media file based on the selected audio media file being a familiar media file or an unfamiliar media file.

10. A non-transitory machine readable storage medium comprising instructions that, when executed, cause at least one machine to at least:

detect a driving condition based on sensor data generated by a sensor in a vehicle, the sensor data indicative of an interaction between a user and the vehicle, the interaction defining a characteristic of a user input relative to a component of the vehicle;

determine a target user state score for the user based on the driving condition and a maximum peak relative to peaks in a distribution, the distribution including a mapping of media play counts to previous corresponding state scores; and select, as a selected audio media file, one of a plurality of audio media files to present to the user based on the target user state score.

11. The storage medium of claim 10, wherein the instructions, when executed, cause the machine to:

access user state scores of the audio media files; and select the selected audio media file based on the user state score of the selected audio media file and the target user state score.

12. The storage medium of claim 10, wherein the sensor data is indicative of a fluctuation in a force applied on a steering wheel.

13. The storage medium of claim 10, wherein the sensor data is indicative of use of windshield wipers.

14. The storage medium of claim 10, wherein the sensor data is indicative of a brake pedal depression frequency.

15. The storage medium of claim 10, wherein the sensor data is indicative of a vehicle direction change frequency.

16. The storage medium of claim 10, wherein the sensor data is indicative of use of vehicle climate control.

17. The storage medium of claim 10, wherein the instructions, when executed, cause the machine to output the selected audio media file for presentation to the user.

18. A non-transitory machine readable storage medium comprising instructions that, when executed, cause at least one machine to at least:

access driving condition data generated by a sensor in a vehicle;

select, as a selected audio media file, one of a plurality of audio media files to present to a driver based on the driving condition data;

access play counts that quantify playback of one or more of the audio media files;

compare play counts of the audio media files to a threshold number of playbacks;

categorize respective ones of the audio media files as familiar media files when the corresponding play counts satisfy the threshold number of playbacks;

categorize respective ones of the audio media files as unfamiliar media files when the corresponding play counts do not satisfy the threshold number of playbacks; and select the selected audio media file based on the selected audio media file being a familiar media file or an unfamiliar media file.

19. An apparatus comprising:
memory;
instructions; and
processor circuitry to execute the instructions to:

detect a driving condition based on sensor data generated by a sensor in a vehicle, the sensor data indicative of an interaction between a user and the vehicle, the interaction defining a characteristic of a user input relative to a component of the vehicle;

determine a target user state score for the user based on the driving condition and a maximum peak relative to peaks in a distribution, the distribution including a mapping of media play counts to previous corresponding state scores;

select, as a selected audio media file, one of a plurality of audio media files to present to the user based on the target user state score; and cause the selected audio media file to be output for presentation to the user.

20. The apparatus of claim 19, wherein the processor circuitry is to:

access user state scores of the audio media files; and select the selected audio media file based on the user state score of the selected audio media file and the target user state score.

21. The apparatus of claim 19, wherein the sensor data is indicative of a fluctuation in a force applied on a steering wheel.

22. The apparatus of claim 19, wherein the sensor data is indicative of use of windshield wipers.

23. The apparatus of claim 19, wherein the sensor data is indicative of a brake pedal depression frequency.

24. The apparatus of claim 19, wherein the sensor data is indicative of a vehicle direction change frequency.

25. The apparatus of claim 19, wherein the sensor data is indicative of use of vehicle climate control.

26. An apparatus comprising:
memory;
instructions; and
processor circuitry to execute the instructions to:

access driving condition data generated by a sensor in a vehicle;

select, as a selected audio media file, one of a plurality of audio media files to present to a driver based on the driving condition data;

access play counts that quantify playback of one or more of the audio media files;

compare play counts of the audio media files to a threshold number of playbacks;

categorize respective ones of the audio media files as familiar media files when the corresponding play counts satisfy the threshold number of playbacks;

categorize respective ones of the audio media files as unfamiliar media files when the corresponding play counts do not satisfy the threshold number of playbacks; and select the selected audio media file based on the selected audio media file being a familiar media file or an unfamiliar media file.

* * * * *